United States Patent
Nakane et al.

(10) Patent No.: US 6,424,473 B1
(45) Date of Patent: Jul. 23, 2002

(54) LENS BARREL DEVICE AND METHOD OF ASSEMBLING SAME

(75) Inventors: Takeshi Nakane, Hachioji; Shigeo Hayashi, Okaya; Tatsuo Takanashi, Hachioji, all of (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/605,480

(22) Filed: Jun. 28, 2000

(30) Foreign Application Priority Data

Jun. 29, 1999 (JP) .......................................... 11-184085
Dec. 24, 1999 (JP) .......................................... 11-368190
May 29, 2000 (JP) ....................................... 2000-158808

(51) Int. Cl.$^7$ .............................................. G02B 7/02
(52) U.S. Cl. ...................................... 359/827; 359/813
(58) Field of Search .............................. 359/811, 815, 359/819, 820, 827, 830, 823, 700, 701, 702, 703, 704, 705, 706, 813, 697, 829

(56) References Cited

U.S. PATENT DOCUMENTS

| | | | |
|---|---|---|---|
| 4,046,458 A | * 9/1977 | Smulders et al. | 359/819 |
| 5,172,276 A | * 12/1992 | Ueyama et al. | 359/813 |
| 5,675,445 A | * 10/1997 | Uemura et al. | 359/827 |
| 5,912,772 A | * 6/1999 | Aoki | 359/701 |
| 5,933,285 A | * 8/1999 | Sato et al. | 359/694 |
| 6,201,649 B1 | * 3/2001 | Rudishhauser et al. | 359/808 |
| 6,262,853 B1 | * 7/2001 | Takanashi et al. | 359/703 |

FOREIGN PATENT DOCUMENTS

| | | |
|---|---|---|
| JP | 59-135407 | 8/1984 |
| JP | 60-129715 | 7/1985 |
| JP | 5-107433 | 4/1993 |
| JP | 5-257049 | 10/1993 |
| JP | 6-67077 | 3/1994 |
| JP | 6-94964 | 4/1994 |
| JP | 2816243 | 8/1998 |
| JP | 11-72678 | 3/1999 |

* cited by examiner

Primary Examiner—Ricky Mack
Assistant Examiner—Omar Hindi
(74) Attorney, Agent, or Firm—Osterlenk, Faber, Gerb & Soffen, LLP

(57) ABSTRACT

A body frame, which is a lens barrel device, comprising two semi-circular torus-shaped lens frames, respectively, mounting thereto a forward-group lens and a rearward-group lens, and two guide shafts fixed to one of the lens frames and slidably inserted into a sleeve fixed to the other of the lens frames and into a slot, the two lens frames being supported to advance and retreat relative to each other. When a jig is used to assemble the lens frames, the two lens frames are mounted to the jig while the forward-group lens, the rearward-group lens and the two guide shafts are inserted into the jig with gaps therebetween, the jig being in a state, in which the forward-group lens, the rearward-group lens and the two guide shafts are retained in a predetermined position, and an adhesive is filled into and fixed to the respective gaps to complete assembly. Such lens body frame can ensure optical performance without being affected by accuracy of parts such as lens frames, guide shafts, photographing lenses and so on.

25 Claims, 15 Drawing Sheets

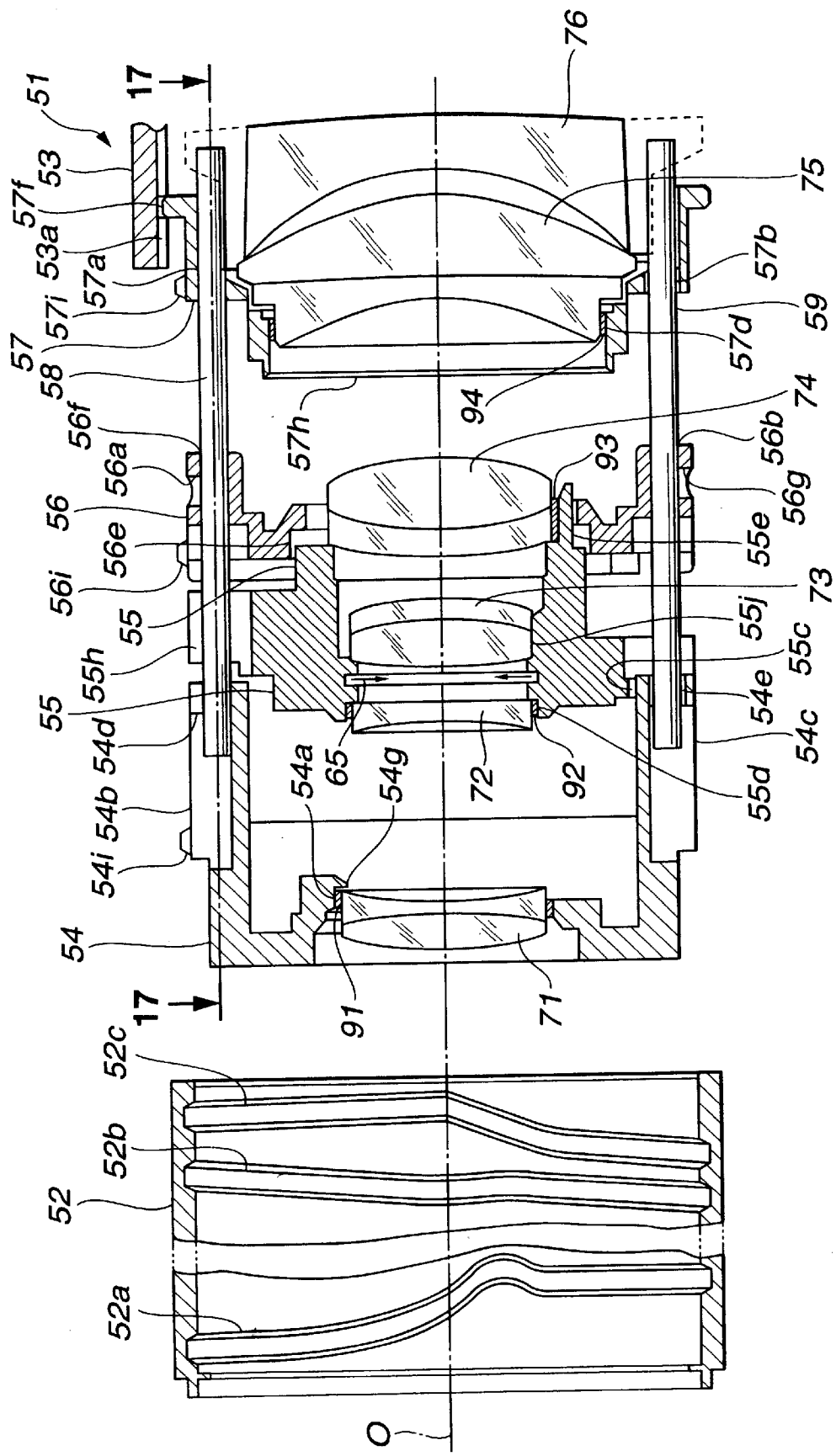

LENS BARREL DEVICE AND METHOD OF ASSEMBLING SAME

This application claims benefit of Japanese Applications No. Hei 11-184085 filed in Japan on Jun. 29, 1999, No. Hei 11-368190 filed in Japan on Dec. 24, 1999 and No. 2000-158808 filed in Japan on May 29, 2000, the contents of which are-incorporated by this reference.

BACKGROUND OF THE INVENTION

1. Field of the Invention

The invention relates to a lens barrel device, a construction of a body frame housed in the lens barrel device, and a method of assembling the lens barrel device.

2. Related Art Statement

Conventional lens barrel devices having a body frame mechanism for retaining a photographing lens and for advancing and retreating the same include, for example, a lens barrel disclosed in Japanese Patent Laid-Open No. Hei 6-67077 and No. Hei 6-94964 and having a body frame construction, in which two guide shafts fixed to or inserted through a lens retaining frame (frame member), serving as a reference, without play are slidably fitted into the other lens retaining frame (frame member) to drivingly advance and retreat the respective lens retaining frames along an optical axis. In addition, a lens or lenses are fixed to the above-mentioned lens retaining frames in a tube adhering condition.

With conventional lens barrels as disclosed in Japanese Patent Laid-Open No. Hei 6-67077 and so on, deviation in optical axes of lenses between lens retaining frames is determined by machining accuracy in lens retaining frames and guide shafts. Also, machining accuracy related to lens retaining frames and photographing lenses affects deviation in optical axes of photographing lenses relative to lens retaining frames. Further, when a plurality of groups of lenses move along an optical axis at the time of zooming, machining accuracy of guide shafts affects deviation in optical axis. Accordingly, there has been the need of adjusting these elements.

Also, Japanese Patent Laid-Open No. Hei 5-257049 discloses and proposes, as a lens barrel device capable of assembly with high accuracy and cost reduction, a lens barrel using a lens retaining frame, which are divided into three sections.

With such conventional lens barrel, when lenses and lens retaining frames are assembled, an assembly jig first fixes and retains the lenses in a reference position relative to a stationary frame. While the assembly jig guides the lens retaining frame, which are divided into three sections each having a cam follower, the lens retaining frame is inserted into outer peripheries of the lenses from three directions. In this state, an adhesive is used to fix the lenses and the lens retaining frame to each other. The assembly jig is taken out, and assembly is terminated. The reason for dividing the lens retaining frame into three sections is to simplify die drawing and to enable multi-cavity molding.

With a conventional lens barrel shown in Japanese Patent Laid-Open No. Hei 5-257049, however, the lens retaining frame is divided into three sections, an assembling operation is hard to perform, and the number of constituent parts is increased, so that productive efficiency is not necessarily good. Also, respective lenses are fixed directly to the lens retaining frame, assembly is carried out involving a dimensional error of the lens retaining frame.

Also, another issue is that it has been earnestly demanded to significantly suppress, as compared with conventional photographing lenses, an amount of deviation in optical axes between respective photographing lenses and groups of photographing lenses conforming to high magnifying power zooming in recent years. Further, while a lens barrel contains therein an AF mechanism, an AE mechanism, a zoom mechanism, an electrical equipment for driving of the mechanisms, and so on, conventional lens barrels are difficult to perform inspection separating a photographing lens optical system and the above-mentioned mechanisms from each other at the time of assembly.

SUMMARY OF THE INVENTION

The invention has been devised to solve the above-mentioned disadvantages, and has its object to provide a lens barrel device, which can ensure optical performance without being affected by accuracy of parts such as frame members, guide members, photographing lenses and so on, and which is easy to assemble and involves less time to assemble. Another object is to provide a method of assembling the lens barrel device.

To attain the above-mentioned objects, a lens barrel device according to the invention comprises an optical element, and a retaining frame having a retaining portion for retaining the optical element, an adhesive being filled between the retaining portion and the optical element, the optical element being retained by the retaining frame in non-contact condition without direct contact therebetween.

Also, a method of assembling a lens barrel device, according to the invention comprises mounting optical elements directly on a jig, then mounting frame members, which serve to retain the optical elements, directly on the jig in non-contact with the optical elements, then filling an adhesive between the frame members and the optical elements, and disengaging the jig from the frame members and the optical elements after curing of the adhesive.

In addition, the above-mentioned and other objects and advantages of the invention will be made apparent from the following description.

BRIEF DESCRIPTION OF THE DRAWINGS

FIG. 16 is a longitudinal cross sectional view showing the lens barrel of the third embodiment after assembly.

DETAILED DESCRIPTION OF THE PREFERRED EMBODIMENTS

Embodiments of the invention will be described with reference to the drawings.

Figure 1:
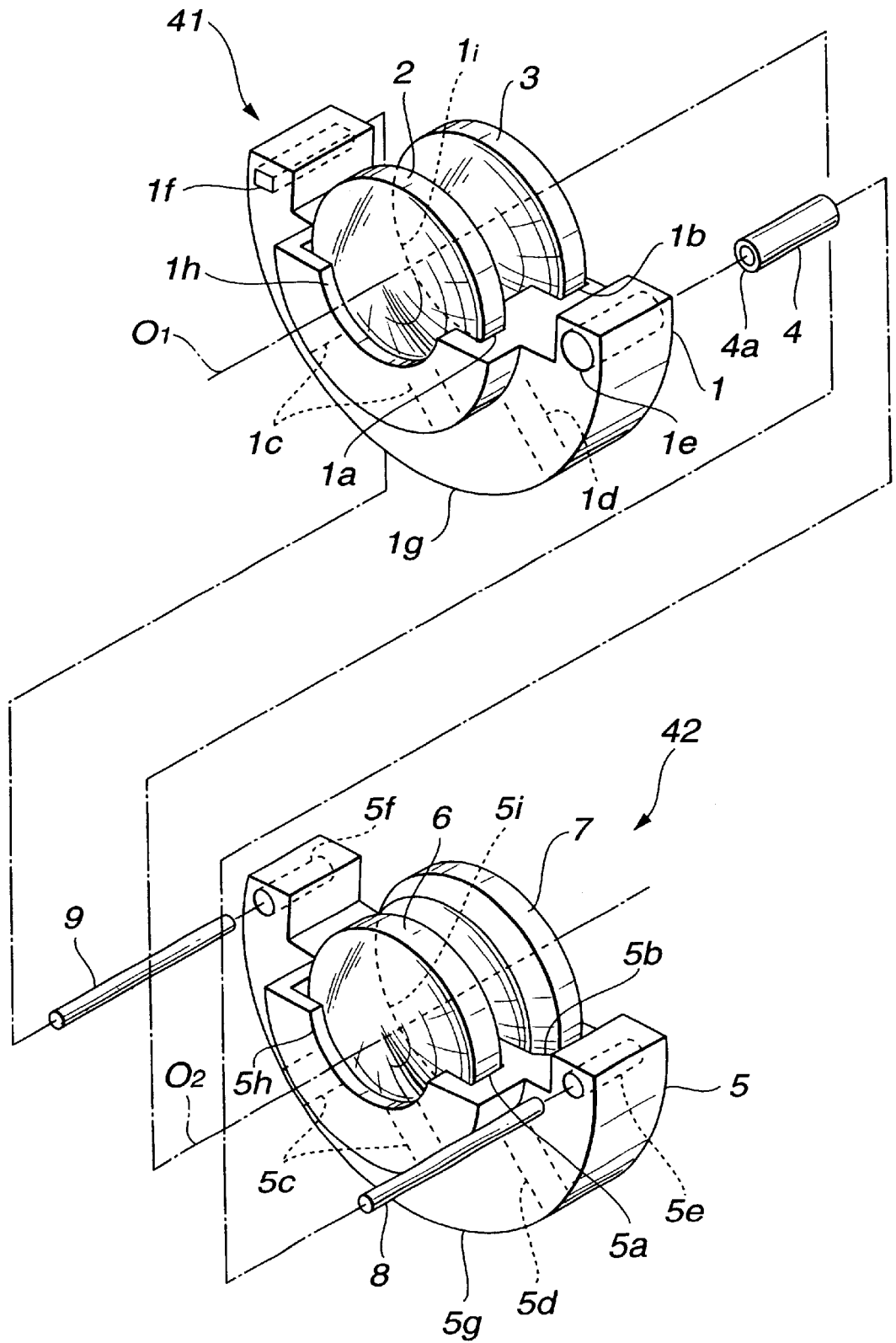
FIG. 1 is an exploded, perspective view showing a body frame according to a first embodiment of the invention.

FIG. 1 is an exploded, perspective view showing a body frame in a lens barrel device according to an embodiment of the invention.

The body frame in a lens barrel device according to the embodiment is a zoom lens body frame of two-group construction and composed of a forward-group body frame 41 and a rearward-group body frame 42, to which guide shafts 8, 9 are fixed. The forward-group body frame 41 is composed of a lens frame 1 being a frame member, forward-group lenses 2, 3, and a sleeve 4 being a guide support member. Also, the rearward-group body frame 42 is composed of a lens frame 5 being a frame member, rearward-group lenses 6, 7 being optical elements for photographing, and guide shafts 8, 9 being guide members (straight rod members).

The lens frame 1 is a member having a substantially semi-circular torus-shaped external shape, and is provided with substantially semi-circular U-shaped grooves 1a, 1b serving as retaining portions, to which the lenses 2, 3 are adhered and fixed, a substantially semi-circular, outer periphery 1g, a sleeve support hole 1e, to which the sleeve 4 is adhered and fixed, a slot if, into which the guide shaft 9 is slidably fitted and which is disposed in symmetry with an optical axis of the sleeve support hole 1e, substantially semi-circular openings 1h, 1i, and insertion holes 1c, id extending through the outer periphery 1g and the U-shaped groove 1a and through the outer periphery 1g and the U-shaped groove 1b. In addition, the slot 1f and the guide shaft 9 loosely fit with each other radially of the lenses 2, 3 and accurately fit with each other in a direction perpendicular to the radial direction to be made slidable.

The lenses 2, 3 are inserted into the U-shaped grooves 1a, 1b in a so-called loose fit, which is a loose state, and are adhered and fixed in a state of being retained in predetermined positions, by an assembly jig 43 described later. At this time, the lens frame 1 retains the lenses 2, 3 with an adhesive, and thus does not contact with the lenses 2, 3 physically (non contact condition) but is fixed thereto through the adhesive. In addition, an optical axis O1 of the lenses 2, 3 aligns with an optical axis O2 of the rearward-group body frame 42 in the above-mentioned predetermined positions.

The sleeve support hole 1e is provided in an end portion of the semi-circular, outer periphery to be in parallel to the optical axis O1. The sleeve 4 is loosely fitted into the hole. When the sleeve 4 is to be adhered to the support hole 1e, it is fixed relative to the guide shaft 8, which is held in a predetermined position by the assembly jig 43 described later, while being fitted into a shaft hole 4a of the sleeve 4. In addition, the shaft hole 4a of the sleeve 4 and the guide shaft 8 are related to each other such that they are slidable relative to each other and fit with each other highly accurately.

The above-mentioned lens frame 5 is a member having a substantially semi-circular torus-shaped external shape, and is provided with substantially semi-circular U-shaped grooves 5a, 5b serving as retaining portions, to which lenses 6, 7 are adhered and fixed, a substantially semi-circular, outer periphery 5g, shaft holes 5e, 5f, which are provided in both end portions of the semi-circular, outer periphery, and to which guide shafts 8, 9 are fixed, substantially semi-circular openings 5h, 5i, and insertion holes 5c, 5d extending through the outer periphery 5g and the U-shaped groove 5a and through the outer periphery 5g and the U-shaped groove 5b.

The lenses 6, 7 are inserted into the U-shaped grooves 5a, 5b in a so-called loose fit, which is a loose state, and are adhesively fixed in a state of being retained in. predetermined positions, by the assembly jig 43. At this time, the lens frame 5 retains the lenses 6, 7 with an adhesive, and thus does not contact with the lenses 6, 7 physically (non-contact condition) but is fixed thereto through the adhesive.

The shaft holes 5e, 5f are in parallel to the optical axis O2 and the guide shafts 8, 9 are fitted (loose fit) into the holes with gaps therebetween to be adhesively fixed thereto.

With the body frame of the embodiment, the guide shafts 8, 9 fixed to the rearward-group body frame 42 are inserted through the shaft hole 4a of the sleeve 4 being fixed to the forward-group body frame 41 and through the slot 1f, respectively, whereby the forward-group body frame 41 is mounted on the rearward-group body frame 42 to enable advancing or retreating relative thereto in a direction of the optical axis. Such advancing or retreating driving causes the body frames to perform a zooming motion.

In addition, although not shown, loaded on an upper portion of the semi-circular lens frames by means of conventional means are necessary members such as an AF mechanism, an AE mechanism, a zoom mechanism, a drive source, for example, a motor, a plunger and so on, reduction gears, and electrical drive equipment.

With the body frame of the embodiment, it is possible to provide a body frame enabling a frame configuration suited for molding and separating inspecting a lens system and other associated mechanisms arranged in the vicinity of the lens system, and to ensure optical performance without being affected by accuracies of parts such as the lens frames 1, 5, the guide shafts 8, 9, the lenses 2, 3, 6, 7 and so on, and machining cost for dies can be reduced and multi-cavity molding can be effected because the lens frames 1, 5 employ a substantially half moon frame configuration suited for synthetic resin molding to eliminate undercut portions, which are required for obtaining an internal reflection preventive configuration, as in conventional lens frames.

Further, employing the above-mentioned substantially half moon frame configuration makes assembly easy, and the above-mentioned AF mechanism, AE mechanism, zoom mechanism, and so on can be arranged in a space defined by an upper half, semi-circular portions of the lens frames, so that inspection of the above-mentioned respective mechanisms can be performed while the mechanisms are separated from the lens system. That is, there is no need to inspect the lens frames, in which the whole of the lenses are incorporated, and so there is an advantage that individual mechanisms can be inspected separately, or by means of other jig optical systems.

In addition, while the body frame of the embodiment is applied to the two-group lens constitution, a similar arrangement can be applied to two or more group lens constitution.

Figure 2:
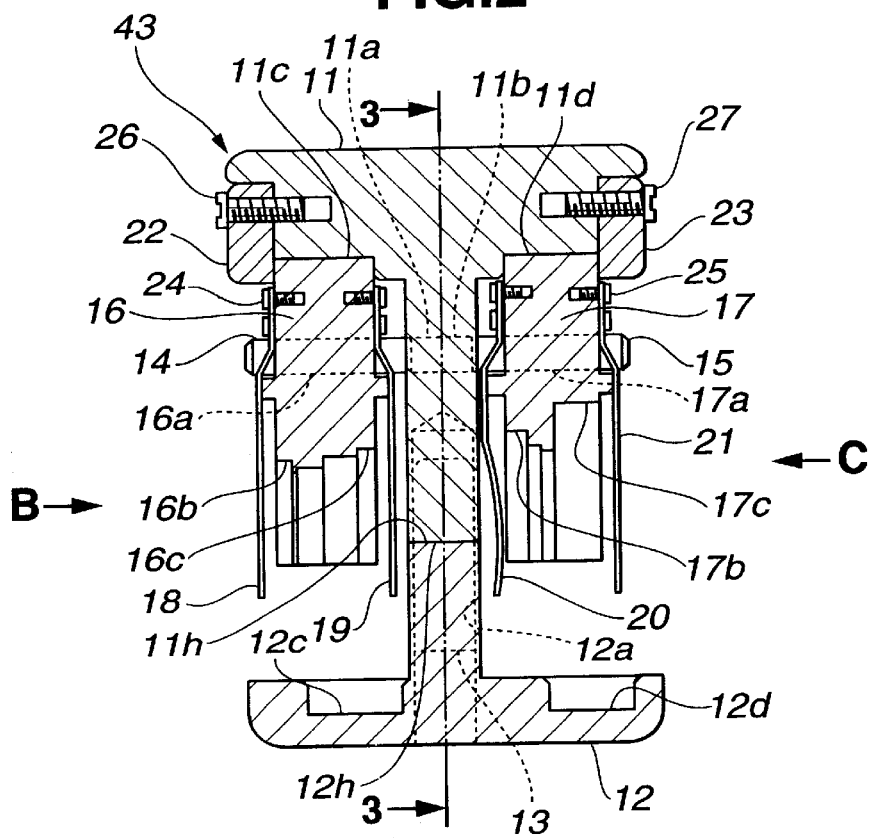
FIG. 2 is a view showing a body frame assembly jig according to the first embodiment of the invention.
Figure 3:
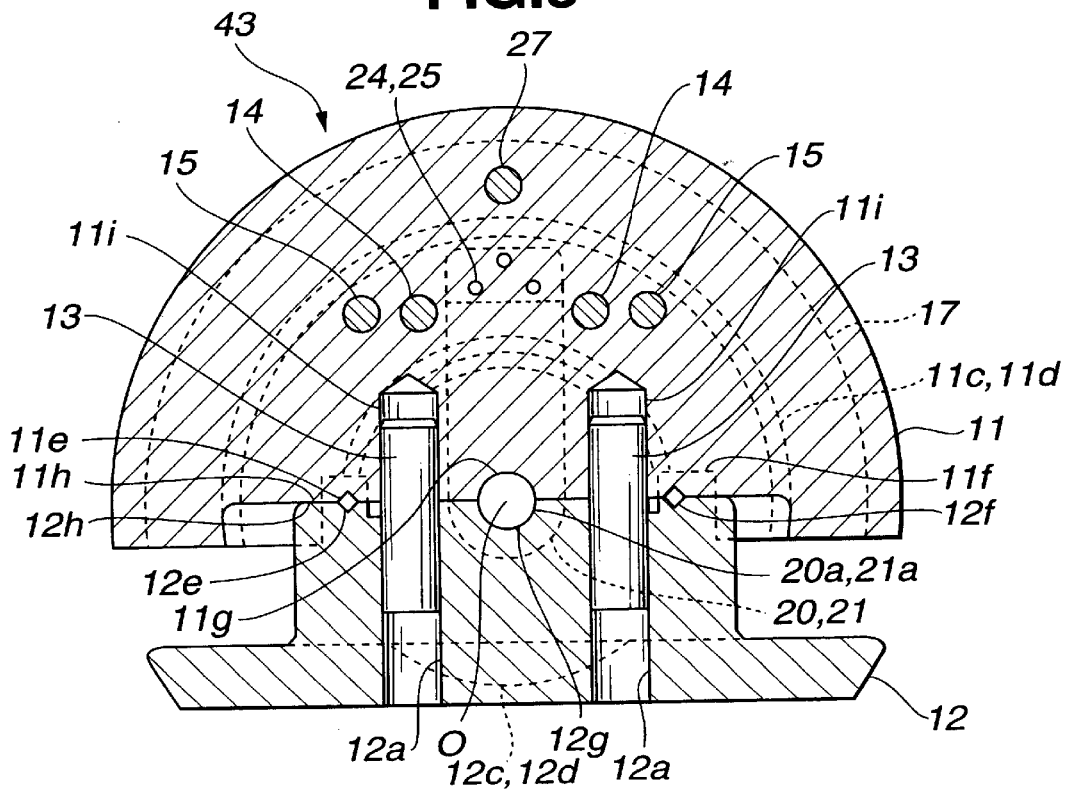
FIG. 3 is a cross sectional view taken along the line A—A in FIG. 2.

An explanation will be given hereinbelow to a body frame assembly jig for assembling of a body frame according to a first embodiment of the invention. FIG. 2 is a longitudinal cross sectional view showing a body frame assembly jig according to the first embodiment of the invention, and FIG. 3 is a cross sectional view taken along the line A—A in FIG. 2.

The body frame assembly jig 43 according to the embodiment is mainly composed of an upper jig 11, a lower jig 12, a forward-group body frame jig 16, a rearward-group body frame jig 17, a forward-group body frame jig retaining plate 22, and a rearward-group body frame jig retaining plate 23.

The upper jig 11 is provided with two positioning pin-holes 11i, into which two positioning pins 13 on the lower jig 12 are fitted, recesses 11c, 11d for positioning the forward-group body frame jig 16 and the rearward-group body frame jig 17 in the direction of the optical axis, a surface 11h facing the lower jig 12, a semi-circular opening 11g arranged on the facing surface 11h to be centered on the optical axis O, and V-shaped notches (guide member mounts) 11e, 11f of divergence angle 90-disposed on the facing surface 11h to extend in parallel to and righthand and lefthand of the optical axis O. Further, respective two positioning pins 14, 15 for positioning the forward-group body frame jig 16 and the rearward-group body frame jig 17 in a direction perpendicular to the optical axis O are fitted into and fixed to shaft holes 11a, 11b extending along the optical axis O.

In addition, the optical axis O coincides with the optical axes of the forward-group body frame 41 is mounted the upper jig 11 and the rearward-group body frame 42. Also, the V-shaped notches 11e, 11f are positioned such that guide shafts 8, 9 of the rearward-group body frame 42 as mounted are set in predetermined positions relative to the optical axes of the lenses 2, 3, 6, 7.

The lower jig 12 is provided with recesses 12c, 12d described later, a surface 12h facing the upper jig 11, a semi-circular opening 12g arranged on the facing surface 11h to be centered on the optical axis O, and V-shaped notches (guide member mounts) 12e, 12f of divergence angle 90-disposed on the facing surface 12h to extend in parallel to the optical axis O, and two positioning pins 13 are fixed to the lower jig to position the upper jig 11.

In addition, the recesses 12c, 12d of the lower jig 12 allow respective thicknesses of the outer periphery 1g of the lens frame of the forward-group body frame 41 and the outer periphery 5g of the lens frame of the rearward-group body frame 42 in the optical axis O to precisely fit thereinto, and have an inner diameter dimension substantially equal to or slightly greater than external diameter dimensions of the respective outer peripheries to allow the respective outer peripheries 1g, 5g to fit thereinto.

Also, of course, respective positions of the optical axis O and the V-shaped notches 12e, 12f are worked and positioned to coincide with the optical axis O and the V-shaped notches 11e, 11f of the upper jig 11 in a state, in which the lower jig is set to the upper jig 11.

Figure 4:
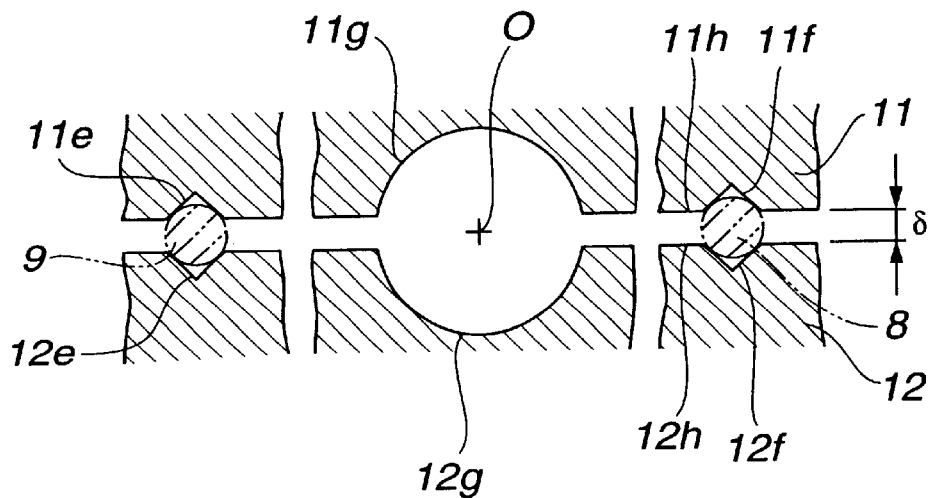
FIG. 4 is a longitudinal cross sectional view about an optical axis O showing the body frame assembly jig, in a set state, according to the first embodiment of the invention.

As shown in FIG. 4 being a longitudinal cross sectional view about the optical axis O in a state with the upper jig 11 and the lower jig 12 set, the guide shafts 8, 9 are interposed in position by the V-shaped notches 11e, 11f and the V-shaped notches 12e, 12f in a state, in which the upper jig 11 and the lower jig 12 are set, in order that the guide shafts 8, 9 be correctly positioned relative to the optical axis O of the lenses 2, 3, 6, 7. At this time, a predetermined gap [δ] δ is produced between the facing surface 11h and the facing surface 12h of the upper jig and the lower jig, as shown in FIG. 4, so as not to generate backlash on the guide shafts 8, 9.

The forward-group body frame jig 16 is provided with a positioning hole 16a, through which the positioning pin 14 is fitted, and positioning recesses (element mounts) 16b, 16c described later, and elastically deformable press plates 18, 19 for interposing therebetween and positioning the lenses 2, 3 in in the direction of the optical axis are fixed to the body frame jig by means of three screws 24.

In addition, the positioning recesses (element mounts) 16b, 16c on the forward-group body frame jig 16 are set in dimension so that the outer peripheries of and end faces, in the direction of the optical axis, of the forward-group lenses 2, 3 abut against the recesses to align the optical axes of the lenses with each other and with the optical axes of the rearward-group lenses 6, 7 mounted on the rearward-group body frame jig 17 as described later. In addition, the press plates 18, 19 are provided with openings 18a, 19a (see FIG. 5), which are centered on the optical axis O of the lenses.

The forward-group body frame jig retaining plate 22 is used to mount the forward-group body frame jig 16 with screws 26 in a state, in which the frame jig is fitted into the recess 11c of the upper jig 11.

The rearward-group body frame jig 17 is provided with a positioning hole 17a, through which the positioning pin 15 is fitted, and positioning recesses (element mounts) 17b, 17c described later, and elastically deformable press plates 20, 21 for interposing therebetween and positioning the lenses 6, 7 in the direction of the optical axis are fixed to the body frame jig by means of three screws 25.

In addition, the positioning recesses (element mounts) 17b, 17c on the rearward-group body frame jig 17 are set in dimension so that the outer peripheries of and end faces, in the direction of the optical axis, of the rearward-group lenses 6, 7 abut against the recesses to align the optical axes of the lenses with each other and with the optical axes. of the forward-group lenses 2, 3 mounted on the forward-group body frame jig 16 as described later. In addition, the press plates 20, 21 are provided with openings 20a, 21a, which are centered on the optical axis O of the lenses.

The rearward-group body frame jig retaining plate 23 is used to mount the rearward-group body frame jig 17 with screws 27 in a state, in which the frame jig is fitted into the recess 11d of the upper jig 11.

An assembling method for the body frame, using the assembly jig 43 of the embodiment constructed in the above-mentioned manner will be described hereinbelow.

Figure 5:
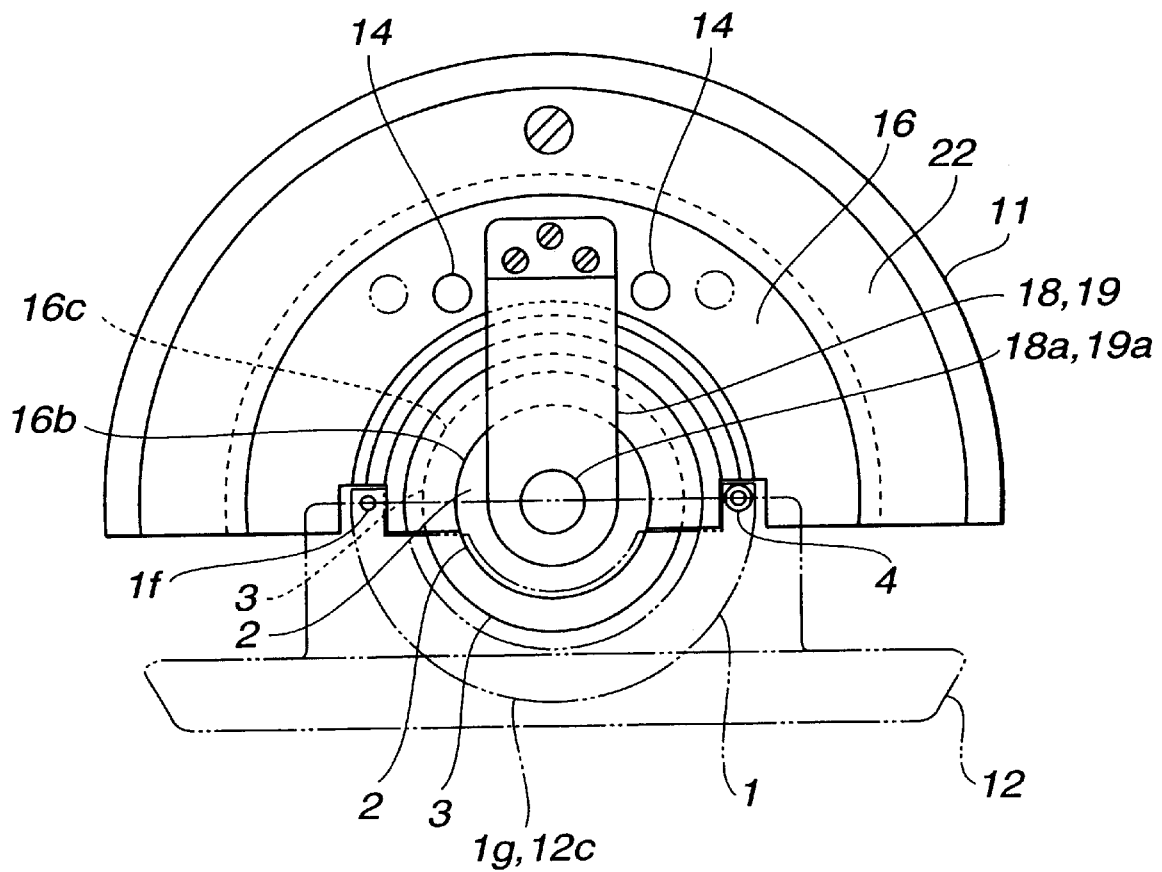
FIG. 5 is a view as viewed from an arrow B in FIG. 2, and showing a state, in which lenses of a forward-group are mounted on an upper jig constituting the body frame assembly jig according to the first embodiment of the invention.
Figure 6:
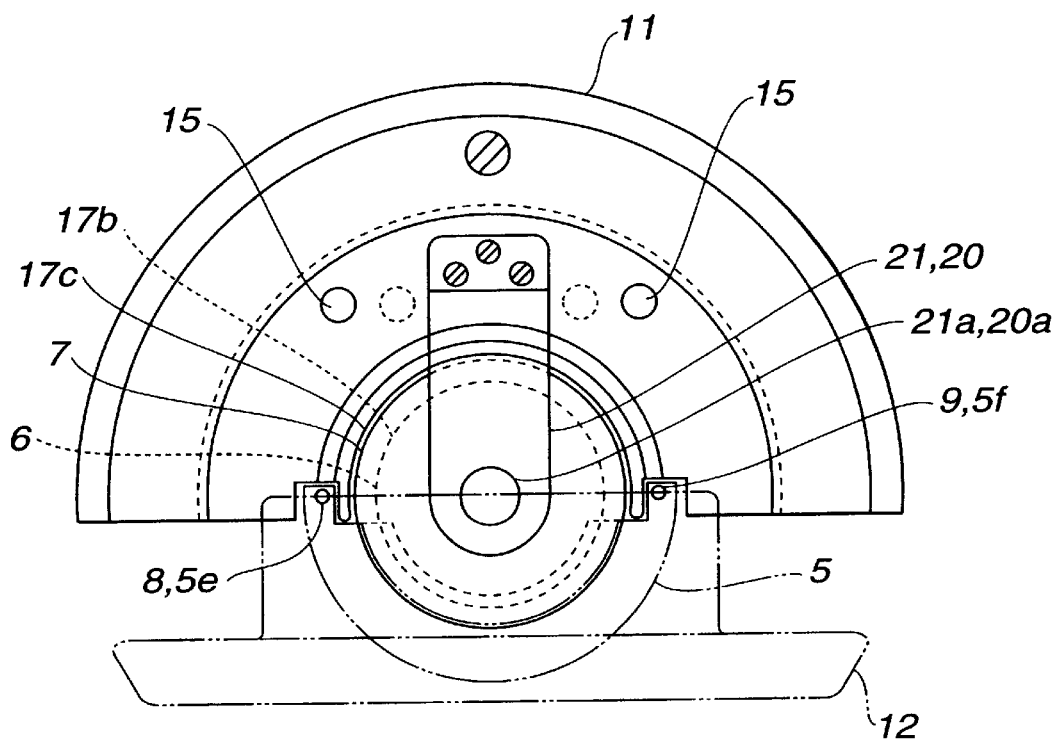
FIG. 6 is a view as viewed from an arrow C in FIG. 2, and showing a state, in which lenses of a rearward-group are mounted on an upper jig constituting the body frame assembly jig according to the first embodiment of the invention.
Figure 7:
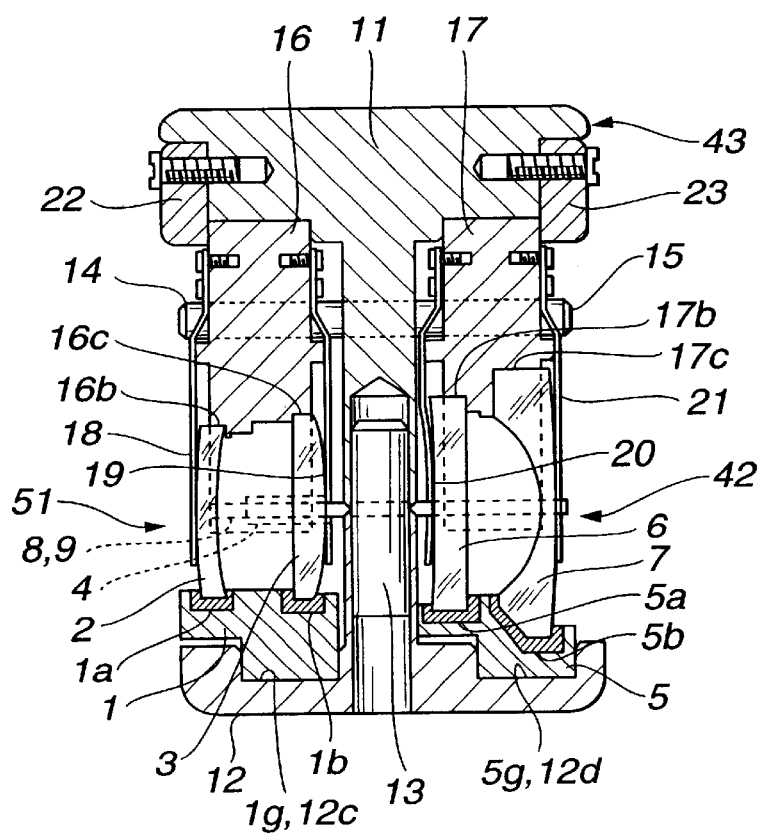
FIG. 7 is a longitudinal cross sectional view showing a state, in which lenses and a lens frame are mounted to the body frame assembly jig according to the first embodiment of the invention.

FIG. 5 is a view as viewed from an arrow B in FIG. 2, and showing a state, in which the forward-group lenses are mounted on the upper jig constituting the body frame assembly jig according to the embodiment of the invention. FIG. 6 is a view as viewed from an arrow C in FIG. 2, and showing a state, in which the rearward-group lenses are mounted on the upper jig. The lens frame and the lower jig mounted below upon assembly are shown by alternate long and two short dashes lines. FIG. 7 is a longitudinal cross sectional view showing a state, in which the lenses and the lens frame are mounted to the body frame assembly jig.

First, as shown in FIG. 5, the forward-group lenses 2, 3 while being interposed between the press plates 18, 19 are mounted to the forward-group body frame jig 16. At this time, the outer peripheries of the lenses 2, 3 are made to surely abut against the positioning recesses 16b, 16c. Likewise, as shown in FIG. 6, the rearward-group lenses 6, 7 are mounted to the rearward-group body frame jig 17 while being interposed between the press plates 20, 21, and at this time, the outer peripheries of the lenses 6, 7 are made to surely abut against the positioning recesses 17b, 17c.

Meanwhile, the guide shafts 8, 9 are loosely fitted into the lens frame 5 on the rearward-group side to be inserted into the lens frame 1 the forward-group side, in a state, in which the sleeve 4 is loosely fitted into the sleeve support hole 1e.

The upper jig 11 is fitted onto the lower jig 12 while the positioning pins 13 are fitted into the upper jig 11, and the outer peripheries 1g, 5g of the lens frames 1, 5, which are mounted to the upper jig 11 and into which the guide shafts are inserted, are placed on the recesses 12c, 12d of the lower jig 12. And the upper jig 11 and the lower jig 12 are set in a state, in which the guide shafts 8, 9 are surely fitted into the V-shaped notches 12e, 12f.

In the above-mentioned set condition of the jigs, the forward-group lenses 2, 3 and the rearward-group lenses 6, 7 are maintained with the guide shafts 8, 9 as a reference in a state, in which the optical axis O1 and the optical axis O2 thereof are aligned with each other. And, a space is maintained between the outer periphery of the forward-group lenses 2, 3 and the U-shaped grooves 1a, 1b of the lens frame 1; between the outer periphery of the rearward-group lenses 2,3 and the U-shaped grooves 5a, 5b of the lens frame 5; between the outer peripheral surface of the guide shafts 8, 9 and the holes 5e, 5f; and between the outer periphery of the sleeve 4 and the sleeve support hole 1e of the forward-group lens frame 1, respectively.

In the above-mentioned state of maintenance, the guide shafts 8, 9 and the whole parts of the lenses 2, 3, 6, 7 are fixed in a desired, predetermined relative relationship. As described above, the lenses 2, 3 are placed in a state, in which they non-contactingly float relative to the lens frame 1 in the direction of the optical axis and in the radial direction. Further, the lenses 6, 7 non-contactingly float relative to the lens frame 5 in the direction of the optical axis and in the radial direction.

Hereupon, in the above-mentioned set condition of the jigs, an adhesive injection tool is inserted through the insertion holes 1c, 1d and the insertion holes 5c, 5d in the lens frames 1, 5 to apply an adhesive into gaps between the respective lenses and the respective U-shaped grooves for adhesion and fixing. Also, the adhesive is applied between the outer periphery of the sleeve 4 and the sleeve support hole 1e of the forward-group lens frame 1 for adhesion and fixing. Further, the adhesive is applied between the outer peripheral surfaces of the guide shafts 8, 9 and the shaft holes 5e, 5f of the lens frame 5 for adhesion and fixing. Thereafter, assembling of the body frame is completed by releasing the upper and lower jigs 11, 12 and taking out the forward-group body frame 41 and the rearward-group body frame 42. In this manner, all the parts being adhered to one another are fixed to one another through the adhesive.

In addition, in a state, in which the upper and lower jigs 11, 12 are set, it is possible to examine positional misregistration (misalignment of centers of the lenses) between the optical axis O1 of the forward-group lenses 2, 3 and the optical axis O2 of the rearward-group lenses 6, 7 making use of light beams transmitting through the openings 11g, 12g of the upper and lower jigs 11, 12, and the openings 18a, 19a of the press plates 18, 19 and the openings 20a, 21a of the press plates 20, 21 on the side of the upper jig 11.

Further, to have the positioning recesses 16b, 16c of the forward-group body frame jig 16 more surely abutting against the outer peripheries of the forward-group lenses 2, 3 and have the positioning recesses 17b, 17c of the rearward-group body frame jig 17 more surely abutting against the outer peripheries of the positioning recesses 17b, 17c, biasing means such as springs are inserted into through the insertion holes 1c, 1d and the insertion holes 5c, 5d in the lens frames 1, 5 to push the respective lenses upward, thus enabling setting the assembly jigs.

With the above-mentioned assembly jig 43 according to the first embodiment, the upper and lower jigs are used to perform positioning (centering) of the forward-group and rearward-group lenses and positioning of the sleeve with the guide shafts as a reference, with the result that the lens frames are slidably supported in a state, in which the guide shafts are fitted into the sleeve or the slot with much less play to suppress eccentricity of the optical axes of the forward-group and rearward-group lenses. In this manner, the use of the assembly jig 43 can accommodate dispersion in molding of and working of lenses to enhance optical accuracy of the body frame as well as yield of lenses and lens frame moldings. In addition, play between the guide shafts and the sleeve or between the guide shafts and the slot of the lens frame enables supporting the respective lens groups in better accuracy through selective fitting.

A body frame according to a second embodiment of the invention will be described hereinbelow.

Figure 8:
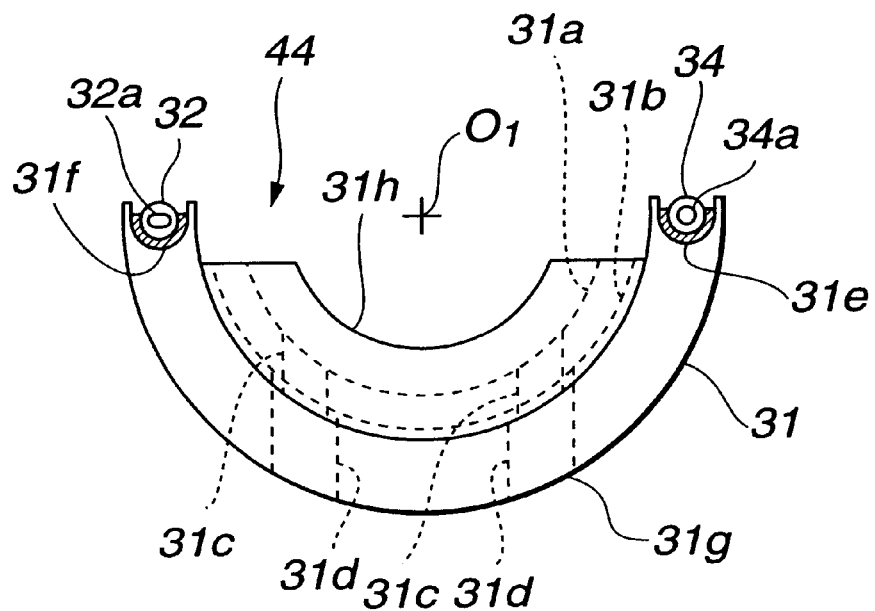
FIG. 8 is a front view showing a lens frame on a forward-group side, which is a body frame according to a second embodiment of the invention.
Figure 9:
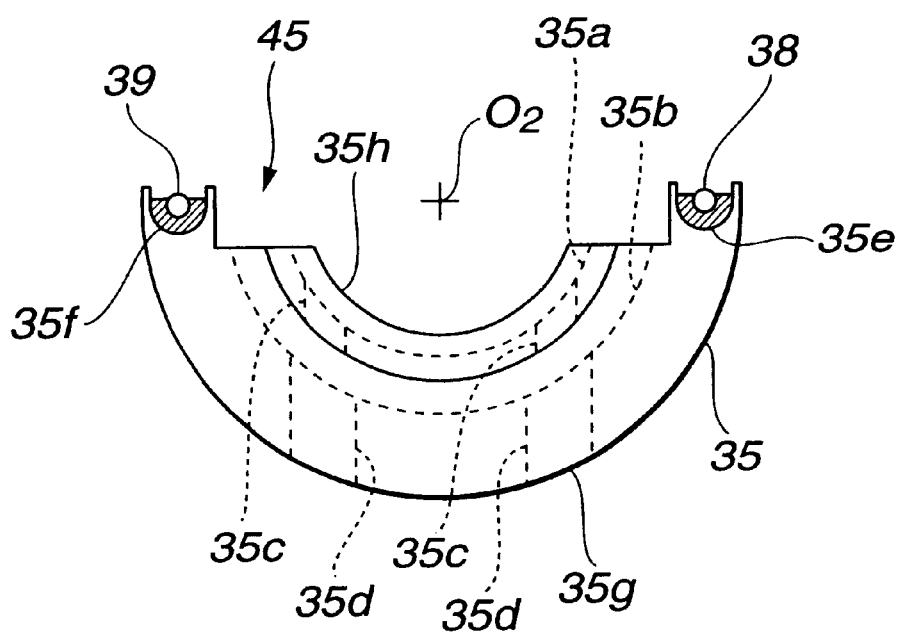
FIG. 9 is a front view showing a lens frame on a rearward-group side, which is a body frame according to the second embodiment.

FIG. 8 is a front view showing a forward-group body frame, which constitutes a body frame in a lens barrel device according to the embodiment. FIG. 9 is a front view showing a rearward-group lens frame, which constitutes the body frame in the lens barrel device according to the embodiment. Here, any lenses are not shown in FIGS. 8 and 9.

The body frame according to the embodiment is also a zoom lens body frame of two-group construction and composed of a forward-group body frame 44 and a rearward-group body frame 45, to which guide shafts 38, 39 are fixed, but is different from the body frame according to the first embodiment in support construction of the guide shafts or the sleeve. In addition, an assembly jig used in assembly of the body frame according to the present embodiment is similar to the assembly jig 43.

The forward-group body frame 44 is composed of a lens frame 31 being a frame member, forward-group lenses (not shown) being a photographing optical element, a sleeve 34 being a guide supporting member, which has a hole 34a adapted to slidably and accurately fit onto the guide shaft 38, and a slot sleeve 32 having a slot 32a, which fits onto the guide shaft 39 loosely in a radial direction of the optical axis and slidably in a direction perpendicular to the radial direction. Also, the rearward-group body frame 45 is composed of a lens frame 35, rearward-group lenses (not shown) being a photographing optical element, and guide shafts 38, 39 being guide members.

The lens frame 31 is a substantially semi-circular torus-shaped external shape, and is provided with substantially semi-circular U-shaped grooves 31a, 31b where two lenses are adhered and fixed to the lens frame 31 in non-contact state (floating state), a substantially semi-circular, outer periphery 31g, a U-shaped notch 31e, to which the sleeve 34 is adhered and fixed, a substantially semi-circular lens opening 31h, and insertion holes 31c, 31d for adhering operation extending through the outer periphery 31g and the U-shaped groove 31a and through the outer periphery 31g and the U-shaped groove 31b.

Two lenses are inserted into the U-shaped grooves 31a, 31b in a loose fit condition (that is, air layers are formed between the frame and the lenses), and an adhesive is filled into the air layers to form adhesive layers for adhesion and fixing while being maintained in a predetermined position by the assembly jig where the optical axes coincide with each other.

The U-shaped notch 31e is one provided on an end portion of the outer periphery to be in parallel to the optical axis O1, and shaped such that the sleeve 34 is inserted into the notch in a loose fit condition (that is, an air layer is formed between the frame and the sleeve).

When the sleeve 34 is to be adhered to the frame, the assembly jig is used to fit a hole 34a of the sleeve 34 onto the guide shaft 38 held in a predetermined position, an adhesive is filled in the air layer in a state, in which the sleeve 34 is placed in the U-shaped notch 31e in non-contact condition (floating condition), to form an adhesive layer for adhesion and fixing.

The U-shaped notch 31f is one provided on an end portion of the outer periphery to be in parallel to the optical axis O1, and shaped such that the slot sleeve 32 is inserted into the notch in a loose fit condition (that is, an air layer is formed between the frame and the sleeve).

When the slot sleeve 32 is to be adhered to the U-shaped notch 31f, the assembly jig is used to fit a slot 32a of the sleeve 32 onto the guide shaft 39 held in a predetermined position, an adhesive is filled in the air layer in a state, in which the sleeve 32 is placed in the U-shaped notch 31f in non-contact condition (floating condition), to form an adhesive layer for adhesion and fixing.

The lens frame 35 is a substantially semi-circular torus-shaped external shape, and is provided with substantially semi-circular U-shaped grooves 35a, 35b where two lenses are adhered and fixed to the lens frame 35 in non-contact condition (floating condition), a substantially semi-circular, outer periphery 35g, U-shaped notches 35e, 35f are adhered and fixed to the guide shaft 38, 39, which are provided on both end portions of an outer periphery of the lens frame 35, and to which the U-shaped grooved 35a, 35f are adhered and fixed, a substantially semi-circular lens opening 35h, and insertion holes 35c, 35d for adhering operation extending through the outer periphery 35g and the U-shaped groove 35a and through the outer periphery 35g and the U-shaped groove 35b.

Lenses are inserted into the U-shaped grooves 35a, 35b in a loose fit condition (that is, air layers are formed between the frame and the lenses), and an adhesive is filled into the air layers to form adhesive layers for adhesion and fixing while being maintained in a predetermined position by the assembly jig.

The U-shaped notches 35e, 35f are ones provided on end portions of the outer periphery to be in parallel to the optical axis O2, the guide shafts 38, 39 are inserted into the notches in a loose fit condition (that is, air layers are formed between the frame and the guide shafts), and an adhesive is filled into the air layers to form adhesive layers for adhesion and fixing while the lens frame and the guide shafts are maintained in a predetermined position by the assembly jig.

In addition, the insertion holes 31c, 31d and the insertion holes 35c, 35d are provided in a vertical direction.

With the body frame constructed in the above-mentioned manner according to the embodiment, the forward-group body frame 44 is mounted to advance and retreat relative to the rearward-group body frame 45 in the direction of the optical axis, by inserting the guide shafts 38, 39 fixed to the rearward-group body frame 45 into the shaft hole 34a of the sleeve 34 and into the slot 32a of the slot sleeve 32.

The body frame according to the embodiment presents the same effect as that in the body frame of the first embodiment. In particular, the U-shaped notches 31e, 31f serve as a support for securing thereto the sleeve 34 and the slot sleeve 32 of the forward-group lens frame 31, and the insertion holes 31c, 31d are ones extending vertically. Likewise, the U-shaped grooves 35e, 35f serve as a support for securing thereto the guide shafts 38, 39 of the rearward-group lens frame 35, and the insertion holes 35c, 35d are ones extending vertically. Therefore, when the lens frames 31, 35 are to be molded, sliding dies are dispensed with, and a die drawing direction is only along the vertical direction, so that multi-cavity molding is facilitated to be effective in reduction of part cost.

A lens barrel in a lens barrel device according to a third embodiment of the invention will be described hereinbelow.

Figure 10:
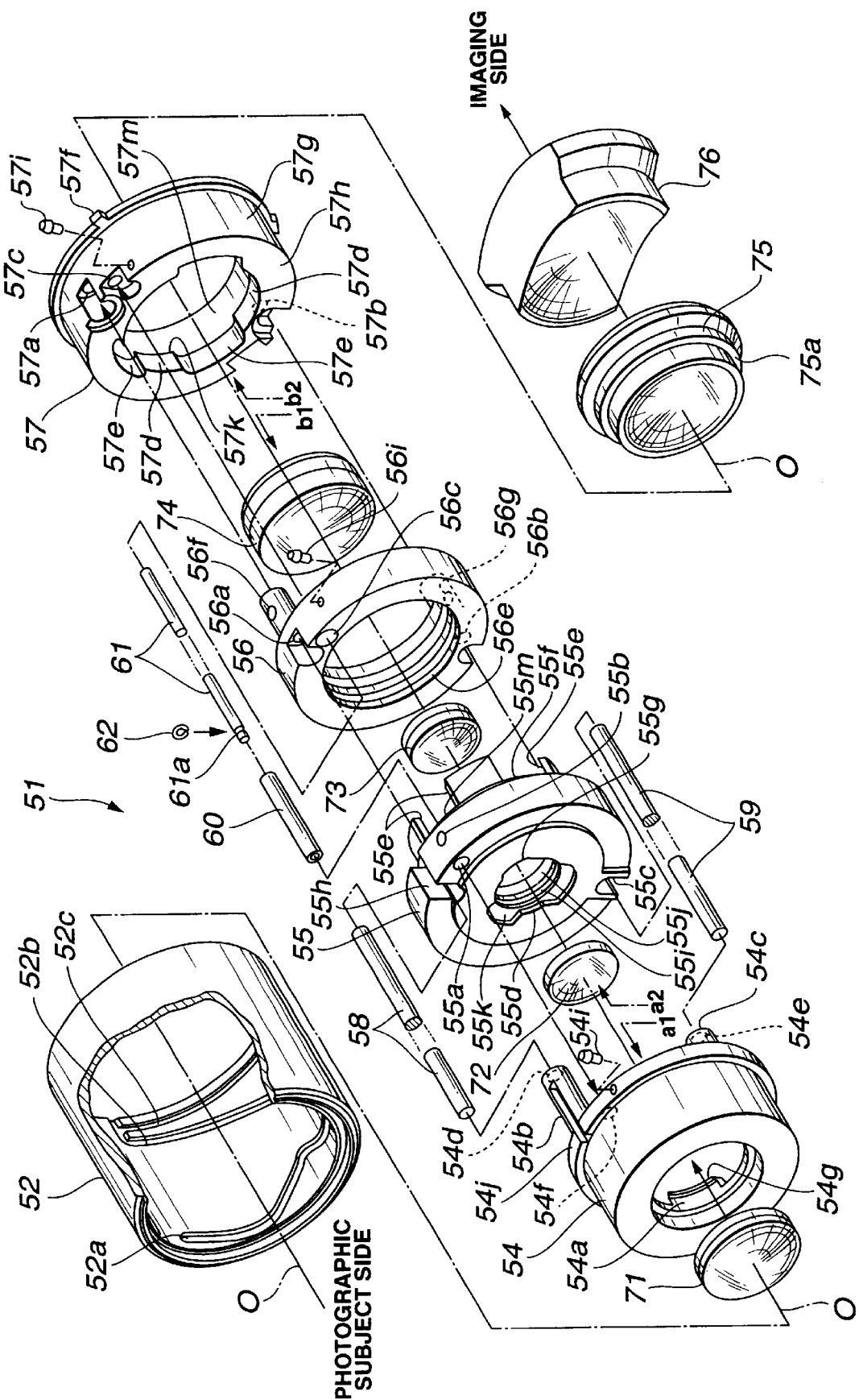
FIG. 10 is an exploded, perspective view showing a lens barrel as a lens barrel device according to a third embodiment of the invention.
Figure 11:
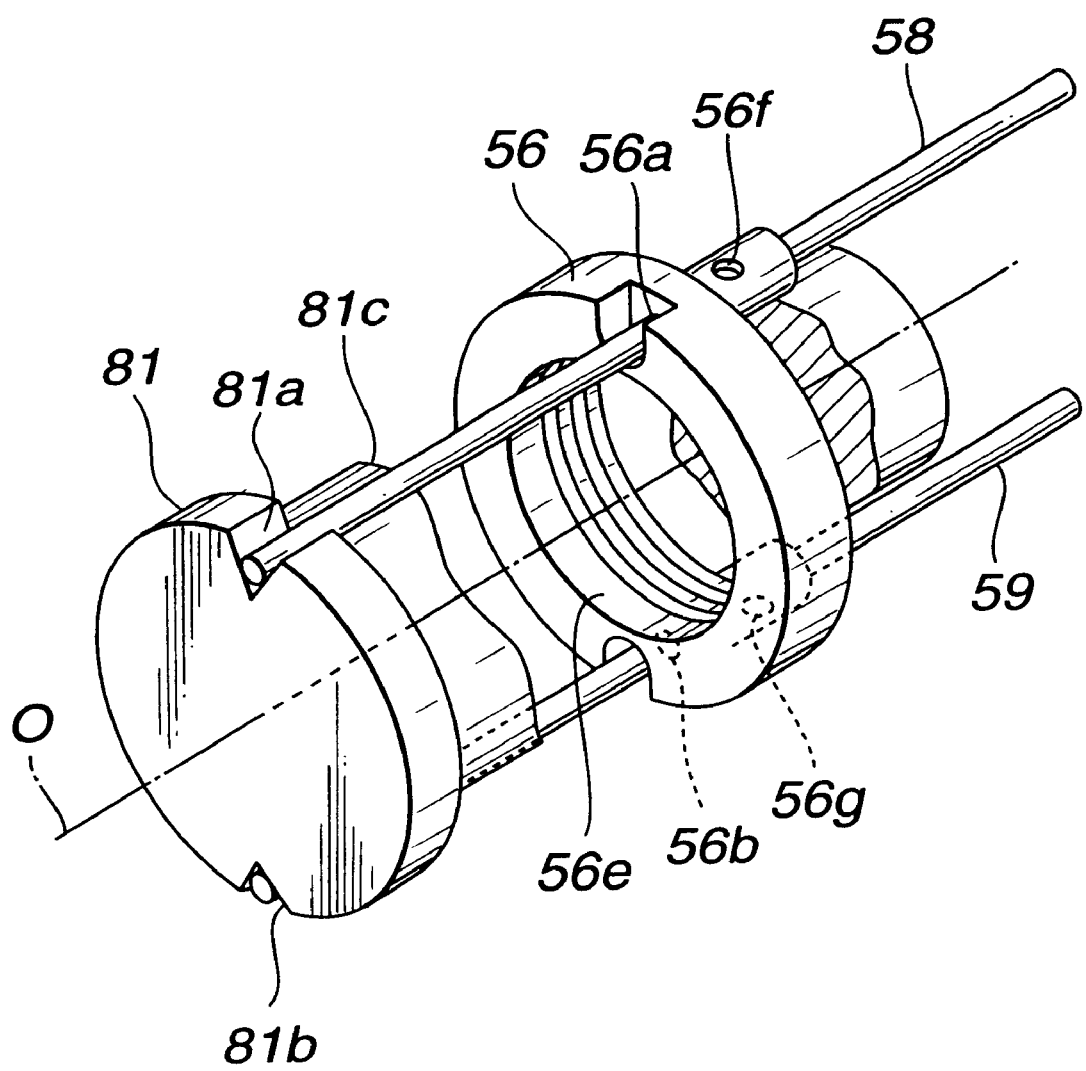
FIG. 11 is a perspective view showing a state, in which a first assembly jig for positioning of guide shafts supports the guide shafts and a focus holding frame on the lens barrel according to the third embodiment.
Figure 12:
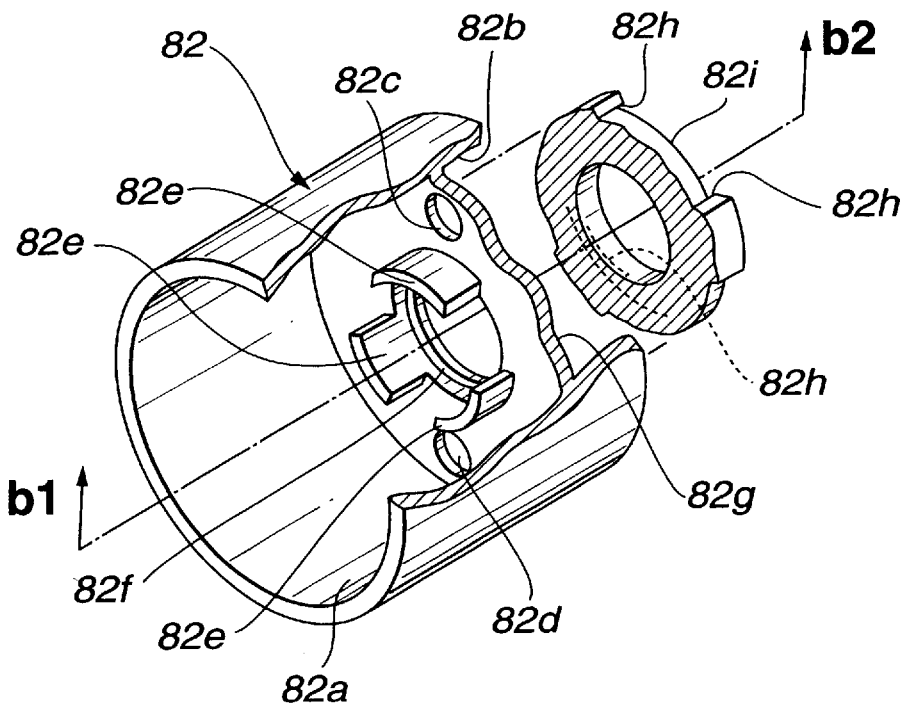
FIG. 12 is a perspective view showing a second assembly jig for positioning of lens retaining frames, applied to assembly of the lens barrel according to the third embodiment.
Figure 13:
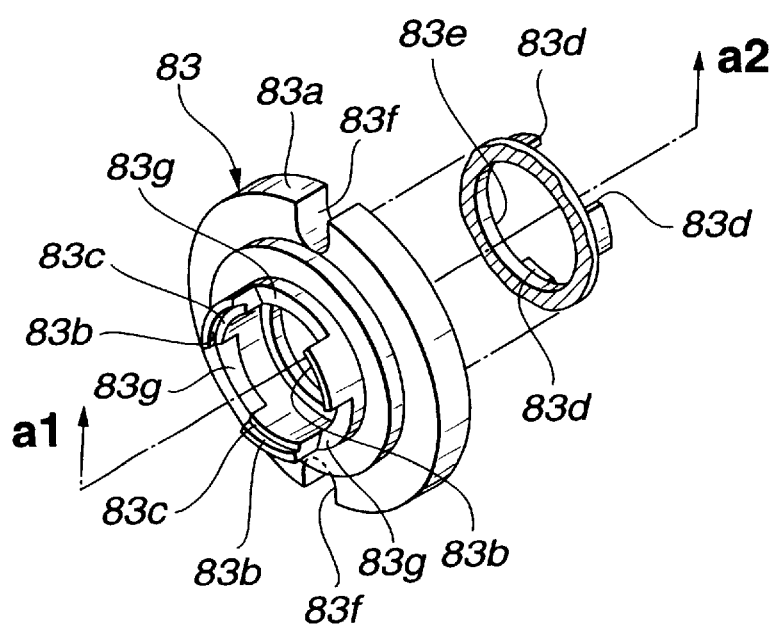
FIG. 13 is a perspective view showing a third assembly jig for positioning of lens retaining frames, applied to assembly of the lens barrel according to the third embodiment.
Figure 14:
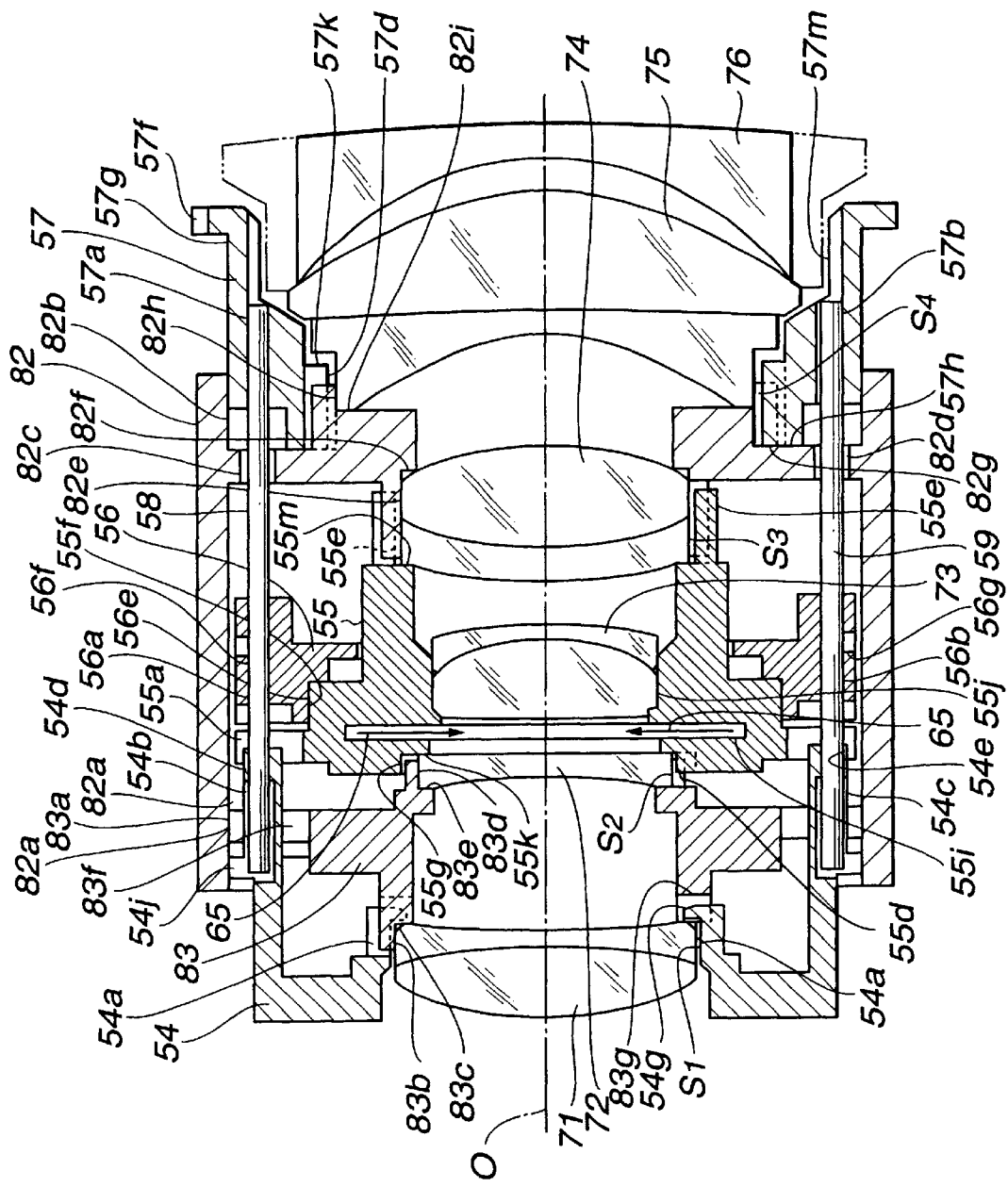
FIG. 14 is a longitudinal cross sectional view showing a state, in which the lens barrel is assembled with the use of second and third assembly jigs for the lens barrel according to the third embodiment.
Figures 15A, 15B, 15C:
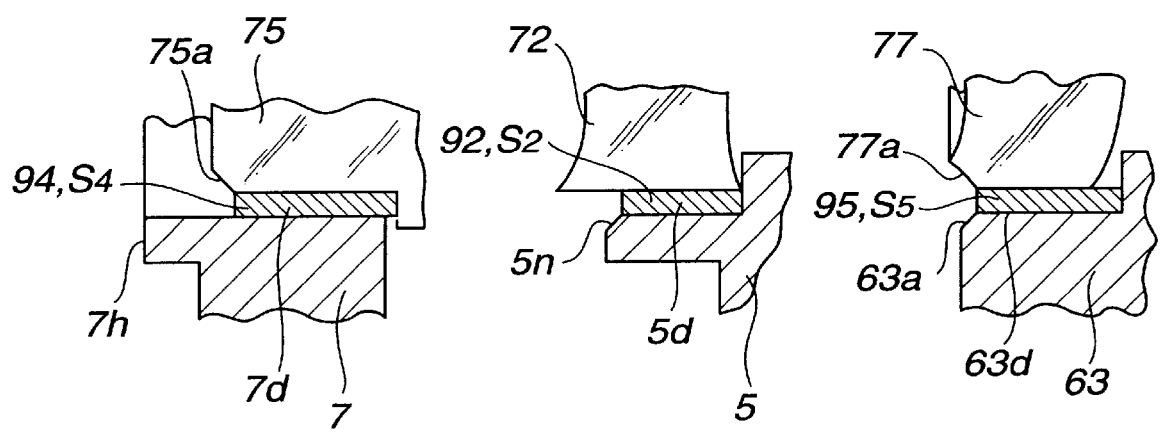
FIG. 15A is an enlarged, cross sectional view showing a cross sectional shape of an adhering portion on a group of lenses and a lens retaining frame in the lens barrel of the third embodiment and a state, in which the lens retaining frame projects beyond the group of lenses.
FIG. 15B is an enlarged, cross sectional view showing a cross sectional shape of an adhering portion on a group of lenses and a lens retaining frame in the lens barrel of the third embodiment and a state, in which the group of lenses projects beyond the lens retaining frame.
FIG. 15C is an enlarged, cross sectional view showing a cross sectional shape of an adhering portion on a group of lenses and a lens retaining frame in the lens barrel of the third embodiment and a state, in which the lens retaining frame and the group of lenses are substantially flush with each other.
Figure 17:
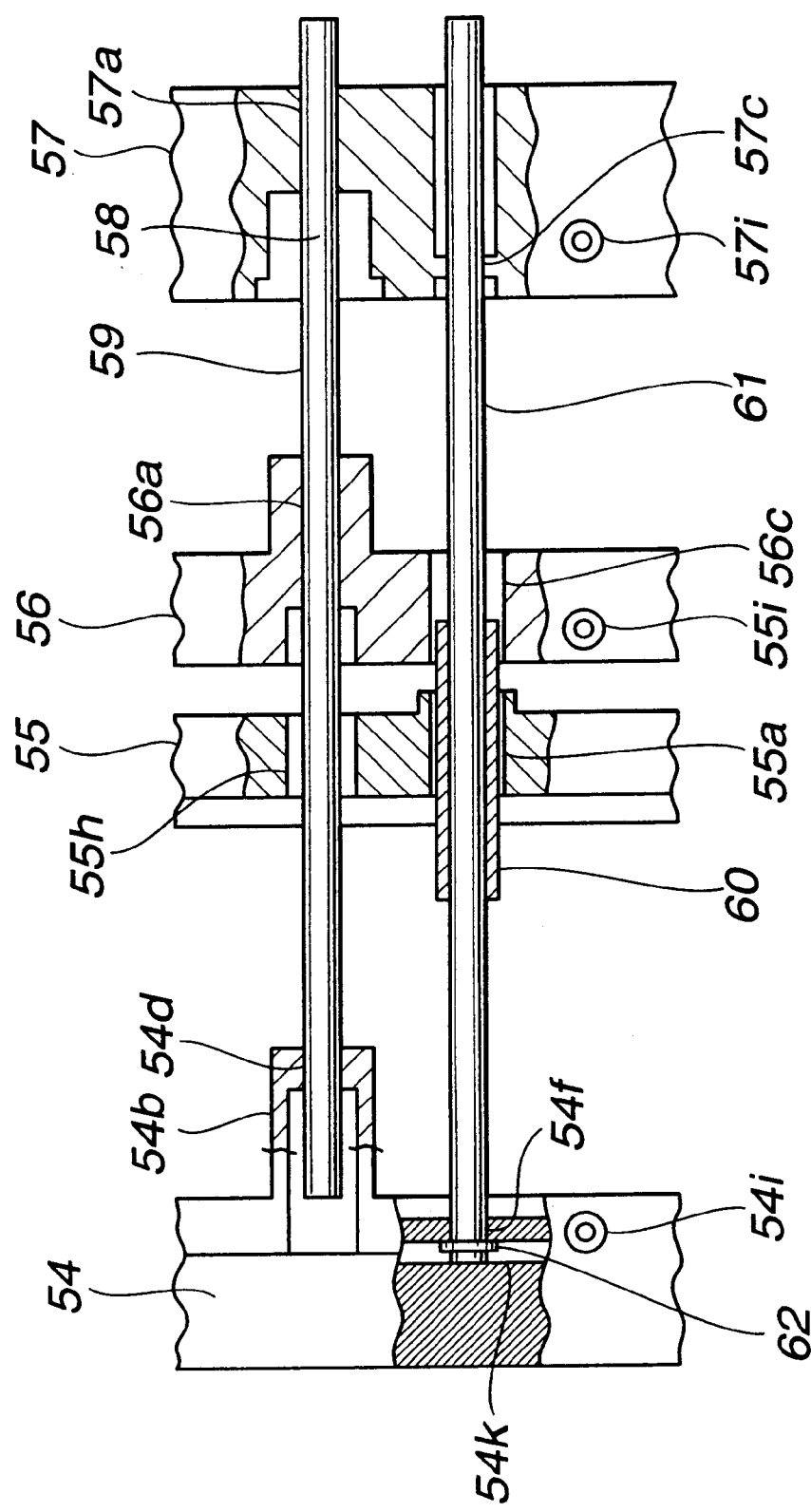
FIG. 17 is a cross sectional view (partial cross sectional view) taken along the line D—D in FIG. 16.
Figure 18:
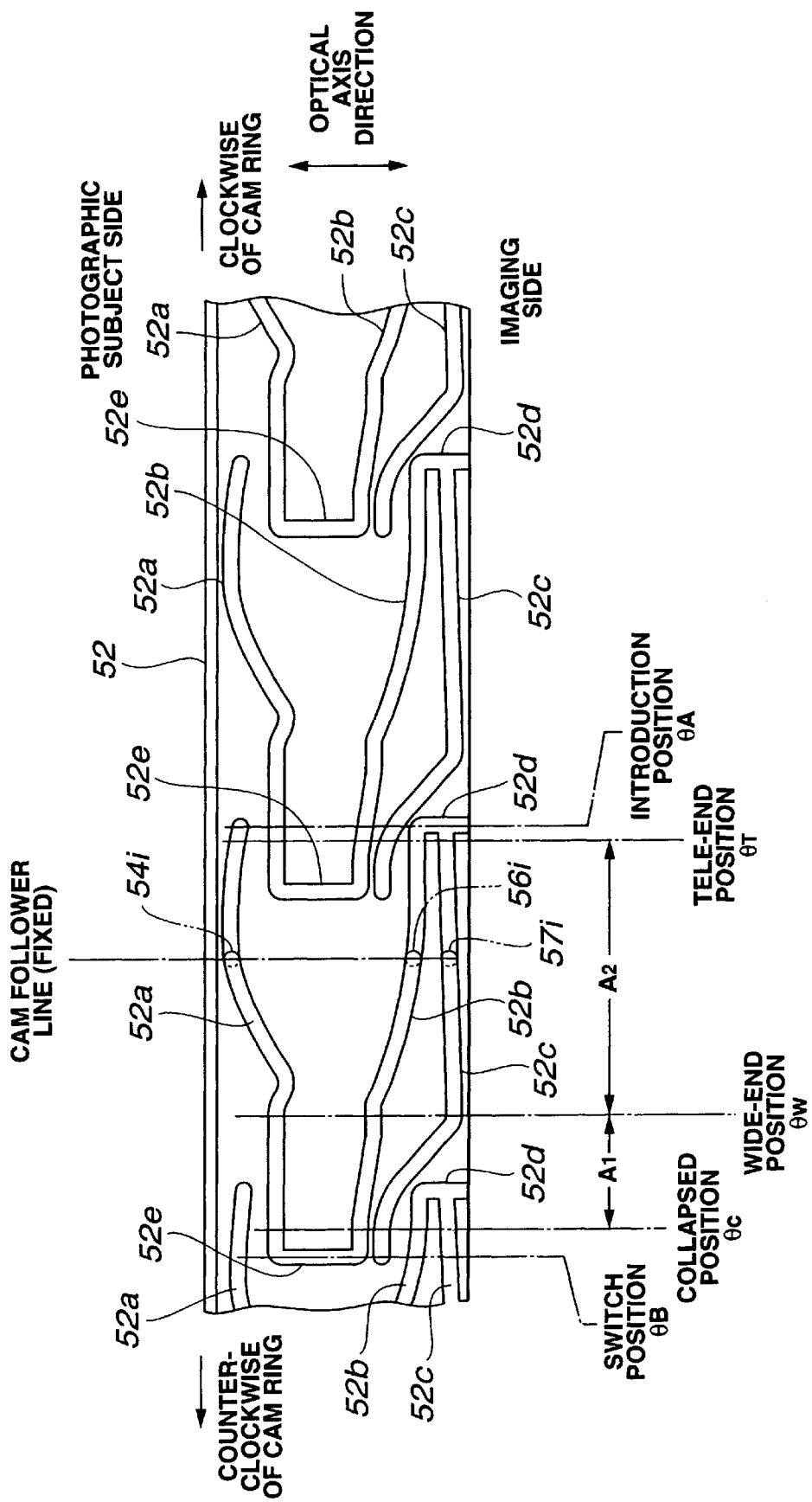
FIG. 18 is a development of cam grooves of a cam ring applied to the lens barrel of the third embodiment.

FIG. 10 is an exploded, perspective view showing a body frame according to the embodiment. FIG. 11 is a perspective view showing a state, in which a first assembly jig for positioning of guide shafts is used to support the guide shafts and a focus holding frame in the lens barrel. FIG. 12 is a perspective view showing a second assembly jig for positioning of the lens and retaining frame of the lens barrel. FIG. 13 is a perspective view showing a third assembly jig for positioning of the lens and retaining frame of the lens barrel. FIG. 14 is a longitudinal cross sectional view showing a state, in which the lens barrel is assembled with the use of second and third assembly jigs for positioning of the lens and retaining frame. FIG. 15A is an enlarged, cross sectional view showing a configuration of a adhering portion of a lens group and a lens retaining frame in the lens barrel and a state, in which the lens retaining frame projects beyond the lens group. FIG. 15B is a view. showing a state, in which the lens projects beyond the lens retaining frame. FIG. 15C is a view showing a state,. in which the lens retaining frame and the lens are positioned in a substantially the same plane. FIG. 16 is a longitudinal cross sectional view showing the lens barrel after assembly. FIG. 17 is a cross sectional view taken along the line D—D in FIG. 16 and a cross sectional view showing parts around the guide shafts in the lens barrel. FIG. 18 is a development of cam grooves applied to the lens barrel.

In addition, a photographic subject side of a lens barrel is a forward side, and an imaging side of the lens barrel is a rearward side. Also, directions of rotation of cam rings and so on is shown as viewed from the forward side (photographic subject side).

A lens body frame 51 in the lens barrel device according to the embodiment is applied as being housed in a zoom camera or as an exchange type zoom lens barrel. As shown in FIG. 10 and so on, the lens body frame comprises a float key 53 (see FIG. 16) limited in rotation and supported in a manner to be capable of advancing and retreating, a cam ring (cam cylinder) 52 supported in a manner to be capable of advancing and retreating, and rotating, a first-group frame 54 of a lens retaining frame (moving frame) relatively driven by the cam ring 52 to advance and retreat, a first-group lens (optical element) 71 retained by the first-group frame 54, a focus retaining frame (moving frame) 56 relatively driven by the cam ring 52 to advance and retreat, a focus frame 55 being a lens retaining frame (moving frame) driven by a focus drive mechanism (not shown) to advance and retreat relative to the focus retaining frame 56, a second-group lens (forward) 72, a second-group lens (middle) 73 and a second-group lens (rearward) 74, which constitute a second-group lens (optical element), and a shutter 65 incorporated into the focus frame 55.

Further, the lens body frame 51 comprises a third-group frame 57 being a lens retaining frame (moving frame) driven by the cam ring 52 to advance and retreat relative to each other, a third-group lens (forward) 75 and a third-group lens (rearward) 76, which constitute a third-group lens (optical element) retained by the third-group frame 57. Further, the lens body frame 51 comprises guide shafts 58, 59 being rod-shaped guide members (straight rod members) fixed to the focus retaining frame 56 and for slidably supporting the first-group frame 54 and the third-group frame 57, and a guide shaft 61 being a rod-shaped guide member (straight rod member) supported by the first-group frame 54 and the third-group frame 57 and for slidably supporting the focus frame 55 through a sleeve 60.

The cam ring 52 is provided, as shown in FIG. 18, longitudinally on an inner periphery thereof with three sets of cam grooves in three columns extending in a direction of rotation.

The above-mentioned three sets of cam grooves are composed of a cam grooves (first cam grooves) 52a, into which cam followers 54i described later slidably fit, cam grooves (second cam grooves) 52b, into which a cam follower 56i described later slidably fits, cam grooves (third cam grooves) 52c, into which cam followers 57i described later slidably fit, and connection grooves 52e and cam follower introducing grooves 52d, which are made use of when the cam followers are incorporated.

The above-mentioned cam ring 52 is dispatched to a photographing enabling position from a collapsed position, and is rotatingly driven to a wide-end position θw to the collapsed position θc on the lens barrel through a zoom drive section (not shown). At the time of zooming operation, the cam ring is rotatingly driven between the wide-end position θw and a tele-end position θt (see FIG. 18). Accompanying the rotating driving, the cam followers are driven through the above-mentioned cam grooves to drivingly advance and retreat the respective lens retaining frames. In addition, a position of the cam ring 52 represented by a position (rotating angle) θ is indicated by positions, to which the above-mentioned cam followers 52a, 52b, 52c are rotated relative to a row of cam followers (fixed).

The above-mentioned first-group frame 54 is provided with an outer periphery 54j, a rearward projection-shaped lens retaining portion 54a having a pawl 54g projected toward the optical axis, rearward projection-shaped boss parts 54b, 54c extending in the direction of the optical axis, a shaft hole 54f, into which a tip end of a guide shaft 61 is fitted, and cam followers 54i capable of fitting into the cam grooves 52a.

An inner periphery of the above-mentioned projection shaped lens retaining portion 54a is dimensioned to provide a loose fit with a gap between it and an outer diameter of the first-group lens 71 as mounted, and to accommodate dispersion in dimensions of associated frames and lens parts as well as to provide gaps, into which an adhesive can be filled. Also, a gap in the direction of the optical axis O is present between a position of the pawl 54g and a surface of the first-group lens 71 to accommodate dispersion in dimensions of associated frames and lens parts in the direction of the optical axis O as well as to provide gaps, into which an adhesive can be filled.

The boss part 54b is provided with a shaft hole 54d, into which the guide shaft 58 slidably fits in an accurate fitting condition. Meanwhile, the boss part 54c is provided with a slot 54e, into which the guide shaft 59 slidably fits about the optical axis O in an accurate fitting condition. Also, the shaft hole 54f is one, which has a relatively small length and into which the guide shaft 61 fits in an accurate fitting condition.

In addition, the above-mentioned or later-mentioned accurate fitting condition is one, in which a pair of members are slidable relative to each other, and an associated hole and shaft fit each other in a condition free of play or in a condition with much less play.

The focus retaining frame 56 is provided with shaft holes 56a, 56b, which are arranged in upper and lower portions of the frame and into which the guide shafts 58, 59 loosely fit (fit with clearances), a relief hole 56c, which is positioned laterally of the shaft hole 56a and through which the guide shaft 61 passes, three cam followers 56i fixed to the outer periphery to be capable of fitting into the cam grooves 52b, and a fitting inner diameter portion 56e. Further, incorporated separately into the focus retaining frame 56 is a focus drive unit composed of a screw mechanism for focus driving a focus frame 55 described later although not shown, and so on.

The guide shafts 58, 59 are adhered and fixed to the shaft holes 56a, 56b in a state, in which they are positioned with the use of an assembly jig 81, which is described later and serves for positioning of the guide shafts. The relief hole 56c is one, into which the sleeve 60 enters together with the guide shaft 61. The fitting inner diameter portion 56e is capable of fitting onto a fitting outer diameter portion 55*f*, described later, of the focus frame 55 in a sliding condition (condition with a slight gap).

The focus frame 55 is provided with lens retaining portions 55*d* and lens relieves 55*g*, which are distributed in three locations on a front, inner periphery of the frame, a shutter incorporating recess 55*i* for mounting of a shutter and a lens retaining portion 55*j*, which are arranged on a central, inner periphery of the frame, three projection-shaped lens retaining portions 55*e* extending rearward in the direction of the optical axis, and a fitting outer diameter portion 55*f* provided on a rearward, outer periphery of the frame to fit into the focus retaining frame. Further, the focus frame 55 is provided with a relief 55*h* for the guide shaft 58, arranged on an upper portion of the frame, a sleeve fitting hole 55*a* arranged laterally of the relief 55*h*, and a U-shaped groove 55*c* arranged on a lower portion of the frame to be capable of fitting and sliding on the boss part 54*c* of the first-group frame 54 in an accurate fitting condition about the optical axis O.

Inner peripheries of the lens retaining portions 55*d* and the lens retaining portions 55*e* are dimensioned to provide a loose fit with gaps between them and outer diameters of the second-group lens (forward) 72 and the second-group lens (rearward) 74, respectively, as mounted, and to accommodate dispersion in dimensions of associated frames and lens parts as well as to provide gaps, into which an adhesive can be filled.

In addition, provided rearwardly of the lens retaining portions 55*d* in the direction of the optical axis O is a lens abutting surfaces 55*k* adapted to abut against a lens surface of the second-group lens (forward) 72 as mounted. Also, provided forwardly of the lens retaining portions 55*e* in the direction of the optical axis O is a lens abutting surfaces 55*m* adapted to abut against a lens surface of the second-group lens (rearward) 74 as mounted.

The lens retaining portion 55*j* has an inner diameter, into which an outer diameter of the second-group lens (middle) 73 fits accurately, and the second-group lens (middle) 73 is adhered and fixed directly to the lens retaining portion.

The sleeve fitting hole 55*a* is dimensioned in diameter to enable fitting the sleeve 60 thereinto in a loose fit to accommodate dispersion in dimensions of associated frames and lens parts and to provide sufficient gaps for adhesion with an adhesive.

The third-group frame 57 is provided with a front end surface portion 57*h*, an outer periphery 57*g*, lens retaining portions 57*d* and jig relieves 57*e*, which are distributed in three locations on a front, inner periphery of the frame, a shaft hole 57*a*, which is disposed on an upper portion of the frame and into which the guide shaft 58 slidably fits in an accurate fitting condition, a slot 57*b*, into which the guide shaft 59 slidably fits about the optical axis O in an accurate fitting condition and fits loosely in a radial direction of the optical axis, and a slot 57*c*, which is provided laterally of the shaft hole 57*a* to be relatively small in length and into which the guide shaft 61 slidably fits in an accurate fitting condition.

Further, the third-group frame 57 is provided with three cam followers 57*i*, which are fixed on the outer periphery 57*g* and capable of fitting into the cam grooves 52*c*, and three projections 57*f* for the straight guide, arranged on a rear flange of the outer periphery 57*g*.

Inner peripheries of the lens retaining portions 57*d* are dimensioned to provide a loose fit with gaps between them and outer diameters of fitting portions of the third-group lens (forward) 75 and the second-group lens (rearward) 74, respectively, as mounted, and to accommodate dispersion in dimensions of associated frames and lens parts as well as to provide sufficient gaps for adhesion with an adhesive.

Also, a gap in the direction of the optical axis is provided between an inside end surface 57*k* on the lens retaining portions 57*d* and a flange surface 75*a* of the third-group lens (forward) 75, and is dimensioned to accommodate dispersion in dimensions of associated frames and lens parts and to provide sufficient gaps for adhesion with an adhesive.

The first assembly jig 81 for positioning of the guide shafts, shown in FIG. 11, a second assembly jig 82 and a third assembly jig 83 for positioning of the lens retaining frames, shown in FIGS. 12, 13, respectively, are used to assemble the lens body frame 51 of the embodiment assembled in the above manner.

The first assembly jig 81 for positioning of the guide shafts is provided, as shown in FIG. 11, with V-shaped grooves 81*a*, 81*b*, which are disposed on upper and lower portions of the jig to keep the guide shafts 58, 59 at a predetermined center distance and in parallel to the optical axis O, and an outer diameter portion 81*c* for positioning, which can fit into the fitting inner diameter portion 56*e* of the focus retaining frame 56 in an accurate fitting condition.

The second assembly jig 82 for positioning of the lens and retaining frame is in the form of a cylinder, which is partitioned forward and rearward by a wall (of which a rearward wall surface is designated by the reference numeral 82*g*), as shown in FIG. 12, and comprises a forward inner peripheral surface 82*a* and a rearward inner peripheral surface 82*b*. The forward inner peripheral surface 82*a* is provided with a stopper (not shown), which functions to position the focus retaining frame 56 in the direction of the optical axis O.

Also, the wall is provided with projection-shaped lens retaining portions (inner peripheral surface) 82*e*, which are distributed in three locations on a front side to project in the direction of the optical axis, a lens abutting surface 82*f* rearwardly of the retaining portions, projection-shaped lens retaining portions (inner peripheral surface) 82*h*, which are distributed in three locations on a rear side to project in the direction of the optical axis, and a lens abutting surface 82*i* forwardly of the inner peripheral surface. Further, the wall is provided with relief holes 82*c*, 82*d*.

The forward inner peripheral surface 82*a* is one, into which the outer periphery 54*j* of the first-group frame 54 and an outer peripheral surface 83*a* of the third assembly jig 83 described later can fit accurately. The rearward inner peripheral surface 82*b* is one, into which the outer periphery 57*g* of the third-group frame 57 can fit accurately.

The lens retaining portions (inner peripheral surface) 82*e*, 82*h*, respectively, are ones, into which outer peripheries of the second-group lens (rearward) 74 and the third-group lens (forward) 75 can fit accurately.

The third assembly jig 83 for positioning of the lens and retaining frame is substantially disk-shaped with the outer peripheral surface 83*a*, as shown in FIG. 13, and is provided with projection-shaped lens retaining portions 83*b*, which are distributed in three locations on a forward side to project in the direction of the optical axis, lens abutting surfaces 83*c* provided rearwardly of the lens retaining portions on inner peripheries thereof, projection-shaped lens retaining portions (inner peripheral surface) 83*d*, which are distributed in three locations on a rear side to project in the direction of the optical axis, lens abutting surfaces 83*e* provided rearwardly of the lens retaining portions on inner peripheries thereof, and relieves 83*f* arranged on upper and lower portions of the jig.

Inner peripheries of lens retaining portions 83b, 83d are ones, into which outer peripheries of the first-group lens 71 and the second-group lens (forward) 72 can fit accurately.

When the lens body frame 51 is to be assembled, the first assembly jig 81 is first applied as shown in FIG. 11 to cause the outer diameter portion 81c for positioning of the frame to fit into the fitting inner diameter portion 56e of the focus retaining frame 56 in order to secure the guide shafts 58, 59 to the focus retaining frame 56. Then the guide shafts 58, 59 inserted through the shaft holes 56a, 56b of the focus retaining frame 56 are fixed to the V-shaped grooves 81a, 81b of the first assembly jig 81. Since there are gaps between the shaft holes 56a, 56b and the guide shafts 58, 59, respectively, the guide shafts 58, 59 can be kept at a predetermined center distance in predetermined positions in the direction of the optical axis and in parallel to the optical axis O.

In the above-mentioned retaining position, an adhesive (fixing agent) is injected from adhesive insertion holes 56f, 56g of the focus retaining frame 56 to fix the guide shafts 58, 59 to the shaft holes 56a, 56b.

The assembly jigs 82, 83 are used to assemble the respective constituent parts of the lens barrel about the focus retaining frame 56, to which the guide shafts 58, 59 are mounted. In addition, at the time of assembling, the jig 82 shown in FIG. 12 is inserted between locations b1, b2 of insertion relative to the lens body frame 51 shown in FIG. 10, and the assembly jig 83 shown in FIG. 13 is inserted between locations a1, a2 of insertion relative to the lens body frame 51 shown in FIG. 10.

First, as shown in FIG. 14 being a longitudinal cross sectional view, the second assembly jig 82 is put into a state, in which an outer periphery of the second-group lens (rearward) 74 is fitted into inner peripheries of the lens retaining portions 82e to cause the surface of the second-group lens to abut against the lens abutting surface 82f.

Meanwhile, with the assembly jig 83, an outer periphery of the second-group lens (forward) 72 is fitted into inner peripheries of the lens retaining portions 83d to cause the lens surface to abut against the lens abutting surfaces 83e.

The focus retaining frame 56, to which the guide shafts are fixed, is inserted into the assembly jig 82, to which the lens is mounted, from a forward side to a reference position in the direction of the optical axis where the frame abuts against a stopper (not shown) of the jig. Further, the fitting outer diameter portion 55f of the focus frame 55, to which the second-group lens (middle) 73 is adhered and fixed, is fitted into the fitting inner diameter portion 56e of the focus retaining frame 56 to be inserted thereinto until the front lens surface of the second-group lens (rearward) 74 abuts against the lens abutting surfaces 55m of the focus frame 55. At this time, the above-mentioned stopper is set to a position such that the focus retaining frame 56 naturally floats relative to the stopper of the jig in the direction of the optical axis, that is, there is produced a gap therebetween.

Then the guide shafts 58, 59 are inserted through the relief 55h and the U-shaped groove 55c of the focus frame 55. Also, the sleeve 60 is mounted in a state, in which it is fitted into the sleeve fitting hole 55a of the focus frame 55 to be inserted through the relief hole 56c of the focus retaining frame 56.

Thereafter, the assembly jig 83, to which the lens is mounted, is fitted into the forward inner peripheral surface 82a of the assembly jig 82 until the rearward lens surface of the second-group lens (forward) 72 abuts against the lens abutting surfaces 55k of the focus frame 55. At this time, the projection-shaped lens retaining portions 83d of the assembly jig 83 fit into the lens relieves 55g.

Prior to assembling of the first-group frame 54, the guide shaft 61 is fitted and inserted into the shaft hole 54f of the first-group frame 54 and an E-ring 62 is fitted onto an E-ring groove 61a at a tip end of the guide shaft (see FIG. 17). The E-ring 62 causes the guide shaft 61 to advance and retreat together with the first-group frame 54.

The first-group frame 54 with the guide shaft 61 is inserted to a reference position forwardly of the third assembly jig 83 in the direction of the optical axis where it abuts against a stopper (not shown) of the assembly jig 82. Alternately, in place of the stopper, tip ends of the pawls 54g of the first-group frame 54 in the direction of the optical axis may be made to abut against the reliefs 83g of the assembly jig 83.

At this time, the guide shaft 58 is inserted through the shaft hole 54d of the first-group frame 54, and the guide shaft 59 is fitted into the slot 54e of the first-group frame 54. Further, the boss part 54c of the first-group frame 54 is fitted into the U-shaped groove 55c of the focus frame 55. The guide shaft 61 is inserted through the sleeve 60 on the focus frame 55, and then is kept while being inserted through the relief hole 56c of the focus retaining frame 56.

Thereafter, upon insertion of the first-group lens 71 into the first-group frame 54, the first-group lens 71 abuts against the lens abutting surfaces 83c of the assembly jig 83 while an outer periphery of the lens floats on the first-group frame 54 and in the direction of the optical axis. An outer diameter portion of the first-group lens 71 accurately fits into the lens retaining portions 83b to be supported on the assembly jig 83.

Subsequently, the third-group frame 57 is fitted and inserted into the rearward inner peripheral surface 82b of the assembly jig 82 to reach a reference position in the direction of the optical axis where the end surface portion 57h abuts against the wall surface 82g. At this time, the guide shafts 58, 59, 61, respectively, are fitted into the shaft hole 57a, 58, 59, 61, respectively, are fitted into the shaft hole 57a, the slot 57b and the slot 57c. Also, the lens retaining portions 82h of the jig 82 fit into the reliefs 57e of the third-group frame 57.

In a state of the third-group frame 57 being inserted, the third-group lens (forward) 75 is fitted into the lens retaining portions (inner peripheral surface) 82h of the assembly jig 82 to be positioned with its lens end surface abutting against the lens abutting surface 82i.

In a state, in which the respective constituent parts of the lens barrel are set to the assembly jigs 82, 83, the guide shafts 58, 59 fixedly supported on the focus retaining frame 56 extend through the respective shaft holes to cause the first-group frame 54 and the third-group frame 57 to be positioned with a predetermined accuracy with respect to a position of the optical axis O and a postion in the direction of the optical axis O (see FIG. 16). Further, the boss part 54c of the first-group frame 54 is used to angularly position the focus frame 55 about the optical axis O with a predetermined accuracy (see FIG. 16).

Meanwhile, the first-group lens 71, the second-group lens (forward) 72, the second-group lens (rearward) 74 and the third-group lens (forward) 75 are caused by the assembly jigs 82, 83 to be fitted into the inner peripheral surfaces of the respective lens retaining portions disposed at three locations, in an accurate fitting and centering condition, and to abut against the abutting surfaces to be positioned in the direction of the optical axis O.

As described above, since the outer peripheral portions of the first-group frame 54 and the third-group frame 57 are accurately positioned with respect to a position of the optical axis O and a postion in the direction of the optical axis O by the assembly jig 82, the outer peripheral portions of the respective frame members serve as a reference to have the respective lens groups 71, 74, 75 supported in relatively accurate positions in a floating condition relative to the respective parts. Also, circumferences of the group lenses 72, 74 float on the focus frame 55.

In addition, outer peripheries of the first-group frame 54 and the third-group frame 57 may be theoretically dimensioned in a manner to fit into the inner periphery of the jig 82 in a loose fit with reduced accuracy. The reason for this is that the guide shafts 58, 59 have already determined positional accuracy thereof.

The respective lens retaining portions of the first-group frame 54, the focus frame 55 and the third-group frame 57, which are distributed in three locations, are positioned in the arrangement along circles of the corresponding inner peripheral surfaces, which are distributed in three locations, of the assembly jigs 82, 83, and thus are positioned relative to outer peripheries of the respective lenses with gaps therebetween, which are suitable for adjustment and adhesion.

The pawl 54g of the first-group frame 54, the retaining end surface 57k of the third-group frame 57, and the flange surface of the lens (the flange surface 75a of the third-group lens 75) have gaps between them and the lens surfaces of the respective lenses in the direction of the optical axis O), which gaps are suitable for positional adjustment in the direction of the optical axis O and adhesion.

Also, the guide shaft 61 adapted for fitting and insertion through the sleeve 60 supported on the focus frame 55 with play therebetween is maintained in an appropriate state in accordance with those positions of the shaft holes in the first-group frame 54 and in the third-group frame 57, which positions are determined by the guide shafts 58, 59 in the above-mentioned manner, even if such positions involve dispersion.

In addition, workability in assembly is further improved when the respective lens retaining portions of the assembly jigs 82, 83 shown in FIGS. 12 and 13 incorporate thereinto a leaf spring type retaining mechanism or the like for preventing dislocation or dropping-off of the respective lenses mounted on the lens retaining portions although not shown.

The sleeves and lenses in the lens body frame 51 are adhered and fixed by means of an adhesive (fixing agent) in a state, in which the assembly jigs 82, 83 are set to be positioned.

First, the sleeve 60 is adhered and fixed by injecting an adhesive from an adhesive injection hole 55b, which is provided on the outer periphery of the focus frame 55 to communicate to the sleeve fitting hole 55a.

Also, the first-group lens 71 is adhered and fixed by injecting and filling an adhesive into a lens retaining gap S1, which is defined by the lens retaining portion 54a, the pawl 54g and the outer periphery of the first-group lens 71, from an opening (not shown) provided in the outer periphery of the first-group frame 54 (see FIG. 14). Instead of injection of the adhesive, adhesion may be effected by beforehand applying the adhesive on the lens retaining portion 54a of the first-group frame 54.

Adhesion and fixing of the second-group lens (forward) 72 are effected by injecting and filling an adhesive into a lens retaining gap S2, which is defined by the lens retaining portions 55d, the lens abutting surfaces 55k and the outer periphery of the second-group lens (forward) 72, from an opening (not shown) provided in the outer periphery of the assembly jig 82. Instead of injection of the adhesive, adhesion may be effected by beforehand applying the adhesive on the lens retaining portion 55d of the focus frame 55.

Adhesion and fixing of the second-group lens (rearward) 74 are effected by injecting and filling an adhesive into a lens retaining gap S3, which is defined by the lens retaining portions 55e, the lens abutting surfaces 55m and the outer periphery of the second-group lens (rearward) 74, from an opening (not shown) provided in the outer periphery of the assembly jig 82. Instead of injection of the adhesive, adhesion may be effected by beforehand applying the adhesive on the lens retaining portion 55e of the focus frame 55.

Adhesion and fixing of the third-group lens (forward) 75 are effected by injecting and filling an adhesive into a lens retaining gap S4, which is defined by the lens retaining portions 57d, the inside end surface 57k and the outer periphery of the third-group lens (forward) 75, from an opening (not shown) provided in the outer periphery of the assembly jig 82. Instead of injection of the adhesive, adhesion may be effected by beforehand applying the adhesive on the lens retaining portion 57d of the third-group frame 57.

Here, the third-group lens (rearward) 76 is made to abut against the rearward side surface of the third-group lens (forward) 75 and adhered and fixed thereto by filling an adhesive into a gap defined by an inner peripheral surface 57m formed on the third-group frame 57 and the outer periphery of the third-group lens (rearward) 76.

In addition, assembling of the third-group lens (rearward) 76 may be performed while observing and adjusting centering of the third-group lens (rearward) 76 together with all of the first-group lens 71, the second-group lenses 72, 73, 74 and the third-group lens (forward) 75. Alternatively, assembling (adhesion) of the third-group lens (rearward) 76 may be performed while observing and adjusting centering of the third-group lens (rearward) 76 relative to assembling parts of the third-group lens (forward) 75 and the third-group frame 57 in a state, in which the third-group lens (rearward) 76 is not present.

In addition, there is the possibility that an adhesive may flow out on surfaces of lenses to affect their optical performances when the adhesive is filled in the lens retaining portions. Hereupon, chamfering is provided on the lens end faces and/or end faces of the lens retaining portions as shown in FIGS. 15A, 15B and 15C to prevent flowing-out of an adhesive.

More specifically, because the end surfaces 57h of the lens retaining portions 57d on the third-group frame 57 project beyond the third-group lens (forward) 75 as shown in, for example, FIG. 15A in a state, in which the lens retaining portion projects beyond the lens, a chamfered portion 75a is provided on the third-group lens (forward) 75. The use of such configuration leads to little flowing-out of an adhesive 94, which is filled in the gap S4, to the lens surface side from the gap S4. Also, because the second-group lens (forward) 72 projects beyond the end faces of the lens retaining portions 55d on the focus frame 55 as shown in, for example, FIG. 15B in a state, in which the lens projects beyond the lens retaining portion, a chamfered portion 55n is provided on the end faces of the lens retaining portions 55d. The use of such configuration leads to little flowing-out of an adhesive 92, which is filled in the gap S2, to the lens surface side from the gap S2.

Also, while a state, in which the lens and the lens retaining portion are flush with each other, is not existent in the lens body frame 51 according to the embodiment, chamfered portions 63a and 77a, respectively, are provided on both the end face of the lens retaining portion 63d and the outer periphery of the lens 77 since the end face of the lens retaining portion 63d on the lens frame 63 is flush with the lens 77 as shown in, for example, FIG. 15C. The use of such configuration leads to little flowing-out of an adhesive 95, which is filled in the gap S5, to the lens surface side from the gap S5.

When assembling and adhering of the guide shafts, lenses and so on are completed by means of the assembly jigs 82, 83 shown in FIG. 14, the assembly jigs 82, 83 are taken out of the lens body frame 51. At this time, the third-group frame 57 is rearwardly taken out of the assembly jig 82, and the first-group frame 54 together with the guide shaft 61 are taken out from the forward side. Then, after the assembly jig 83 is also taken out from the forward side, the focus frame 55 and the focus retaining frame 56 together with the guide shafts 58, 59 are taken out of the assembly jig 82 from the forward side. FIG. 16 is a longitudinal, cross sectional view showing the lens body frame 51 in a state, in which assembly is again performed after the assembly jigs 82, 83 are taken out.

In addition, the support construction for the respective guide shafts enables taking out the lens body frame 51 in the above-mentioned manner even when the assembly jig 82 with the wall (wall surface 82g) is used. More specifically, the reason for this is the utilization of the construction that the guide shaft 61 is supported on the first-group frame 54 side and is slidably supported on the other frame members, and that the guide shafts 58, 59 are fixedly supported only on the focus retaining frame 56, which is arranged centrally, and are slidably supported on the other frame members.

The lens body frame 51, for which assembling has been completed by the jigs, has the need of incorporating thereinto the cam ring 52 and fitting the respective three cam followers 54i, 56i, 57i on the first-group frame 54, the focus retaining frame 56 and the third-group frame 57 into the three sets of cam grooves 52a, 52b, 52c.

The cam ring 52 is rotatingly driven in an extent ranging from the collapsed position θc, which is represented by a position rotating relative to the cam followers, to the tele-end position θT at the time of zoom driving, the cam follower introducing groove 52d is provided in an introduction position θA, which is a position rotating further outside of the tele-end position θT, and the connection groove 52e for movements of the cam followers is provided in a switching position θB, which is a position rotating further outside of the collapsed position θc. The respective cam grooves are provided such that lengths thereof are along a circumferential direction about the optical axis O in a state, in which they are connected to the cam follower introducing groove 52d and the connection groove 52e, and the cam grooves 52a, 52b, 52c are arranged in this order from the photographic subject side.

In addition, the cam follower introducing groove 52d is one in the direction of the optical axis O in a state, in which it is connected to telescoping side ends of the cam grooves 52b, 52c, and is provided on a rearward side thereof with an open insertion port. Also, the connection groove 52e is one in the direction of the optical axis O to be connected to flush body tube side ends of the cam grooves 52a, 52b.

The cam follower introducing groove 52d and the connection groove 52e are used to fit the cam followers into the cam grooves.

First, when the cam follower 54i on the first-group frame 54 shown in FIG. 16 is taken to a position where the cam ring can be inserted, and the cam ring 52 is rotated to the m introduction position θA to be inserted into the lens body frame 51, the cam follower 54i fits into the cam follower introducing groove 52d. When the cam ring 52 is rotated to the switching position θB in a clockwise direction in a state, in which the cam follower 54i reaches an end position of the cam groove 52b, the cam follower 54i passes through the cam groove 52b to reach the connection groove 52e. Hereupon, the cam ring 52 is forced rearwardly of the lens body frame to forward the cam follower 54i to an end position of the cam groove 52a on a forward side. Then the cam ring 52 is rotated in a counter-clockwise direction to be returned to the introduction position θA.

Then when the cam followers 56i, 57i on the focus retaining frame 56 and the third-group frame 57 are set to a position where the cam ring can be inserted, and the cam ring 52 is forced rearwardly of the lens body frame, the cam followers 56i, 57i fit into the cam follower introducing groove 52d. Then the cam ring 52 is rotated in a clockwise direction in a state, in which the cam follower 56i reaches a position on the cam groove 52b and the cam follower 57i reaches a position on the cam groove 52c. The cam follower 56i fits into the cam groove 52b and the cam follower 57i fits into the cam groove 52c. In addition, the cam follower 54i is kept to be fitted into the cam groove 52a, and fitting of the respective cam followers into the cam grooves on the cam ring 52.

Thereafter, the projections 57f on the third-group frame 57 are caused to fit into a straight guide groove 53a provided on a float key 53 so that the third-group frame 57 is supported by the float key 53 to enable advancing and retreating in a non-rotatable condition, thus completing assembly of the lens body frame 51 according to the embodiment.

An explanation will be given hereinbelow to the advancing and retreating motions of the lens body frame 51 assembled in the above-mentioned manner in a state, in which the frame is incorporated in a zooming camera.

In the case where the lens body frame 51 is in a collapsed position, the cam ring 52 is rotated to the collapsed position θc shown in FIG. 18, and is further made to enter a collapsed position in the direction of the optical axis O.

Hereupon, the cam ring 52 is made to enter into the photographing enabling position along the direction of the optical axis O to cause the zoom driving unit to rotate a flush body tube region A1 (see FIG. 18) to the wide-end position θw in a counter-clockwise direction. Such rotation causes the cam grooves 52a, 52b, 52c to advance and retreat the respective cam followers 54i, 56i, 57i relatively, and the first-group frame 54, the focus retaining frame 56 and the third-group frame 57 are moved to a zoom wide-end position where photographing can be performed.

Further, when the zoom driving unit causes the cam ring 52 to zoom drive a zoom region A2 (see FIG. 18) extending to the tele-end position θT, the respective cam followers 54i, 56i, 57i are caused by the cam grooves 52a, 52b, 52c to advance and retreat relatively, so that the first-group frame 54, the focus retaining frame 56 and the third-group frame 57 are relatively moved to the tele-end position from the zoom wide-end position.

Also, a focus drive unit of the lens body frame 51 (not shown) causes the focus frame 55 to advance and retreat relative to the focus retaining frame 56 having been zoom driven, in the direction of the optical axis O.

With the lens body frame 51 according to the third embodiment and the method of assembling the lens body frame 51, the second assembly jigs 82, 83 support the second-group lens (rearward) 74 and the third-group lens (forward) 75, which are a plurality of groups of lenses, and the first-group lens 71 and the second-group lens (forward) 72 in an abutting condition in the direction of the optical axis O and in a position of the optical axis O in an accurate fitting condition, and likewise support the first-group frame 54 and the third-group frame 57, which are a plurality of lens retaining frames, and the third assembly jig 83 in an abutting condition in the direction of the optical axis O and in a position of the optical axis O in an accurate fitting condition. Also, the assembly jigs support the focus retaining frame 56 and the focus frame 55, which are a plurality of lens retaining frames, through the guide shafts 58, 59. Meanwhile, before the groups of lenses set to the assembly jigs are adhered and fixed thereto, the respective lens retaining frames such as the first-group frame 54 and the like, and the respective groups of lenses, such as the first-group lens 71 and the like, retained in the frames are positioned with gaps therebetween.

Accordingly, the above-mentioned support conditions have the respective frame members, guide shafts and the groups of lenses kept in relative positions with predetermined accuracies. Because the groups of lenses are adhered and fixed to the lens retaining frames in the above-mentioned condition, the respective groups of lenses can be adhered and fixed to the lens retaining frames in highly accurate positions relative to outer diameters of the lens retaining frames and to the guide shafts without depending upon accuracy such as dispersion in configuration of the lens retaining frames. It is possible to obtain a lens body frame having a good accuracy in positions of the groups of lenses. Further, concretely stated, centers of the respective lenses deviate less from one another, and are positioned with an exceedingly high accuracy in spacings between surfaces of the lenses.

In addition, with the above-mentioned lens body frame 51, the first-group frame 54, the focus frame 55, the focus retaining frame 56 and the third-group frame 57 are supported by the guide shafts 58, 59, 61 to enable advancing and retreating. The guide shafts 58, 59 are fixed to the focus retaining frame 56 disposed substantially centrally, and both ends of the guide shafts are made slidable relative to the first-group frame 54 and the third-group frame 57. Accordingly, as compared with the conventional construction, in which guide shafts are cantilevered, the present lens body frame involves less flexure in shafts, and less waste in a space occupied to be effective in making a lens body frame small-sized.

Also, the guide shaft 61 slidably supports the focus frame 55, of which rotation about the guide shaft 61 is limited by the boss part 54c of the first-group frame 54, through the sleeve 60. One end of the guide shaft 61 is supported by the shaft hole 54f in the first-group frame 54 and the other end thereof is slidably supported by the slot 57c of the third-group frame 57 as shown in FIG. 17. Because the shaft holes 54f, 57c are both short in fitting length and inclination of the guide shaft 61 permitting the same to be in non-parallel to the guide shafts 58, 59 has freedom, it is possible to accommodate dispersion and error in the frame members not to interfere with movements of the first-group frame 54 and the third-group frame 57 even when the first-group frame 54 or the third-group frame 57 is worse to some extent in dimensional accuracy.

Also, in the case where the guide shaft 61 having a small diameter applies, even when focus driving causes a high load torque to apply between the focus frame 55 and the focus retaining frame 56 at the time of focus driving, the focus frame 55 is prevented from varying much in position since the fitting outer diameter portion 55f of the focus frame and the fitting inner diameter portion 56e of the focus retaining frame fit each other in a sliding condition.

A lens body frame (lens barrel device) according to a fourth embodiment will be described hereinbelow.

Figure 19:
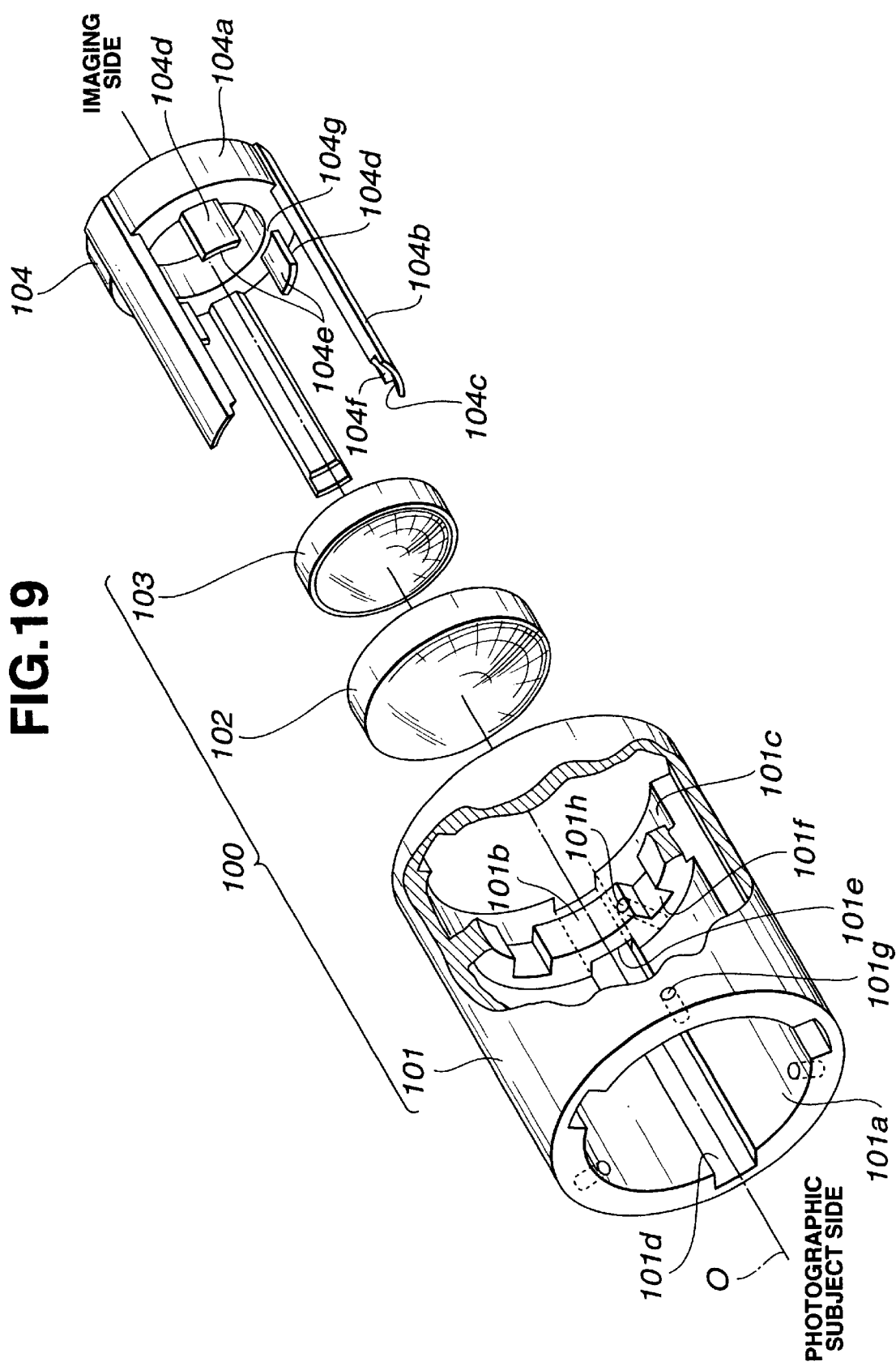
FIG. 19 is an exploded, perspective view showing a lens barrel as a lens barrel device according to a fourth embodiment of the invention and an assembly jig.
Figure 20:
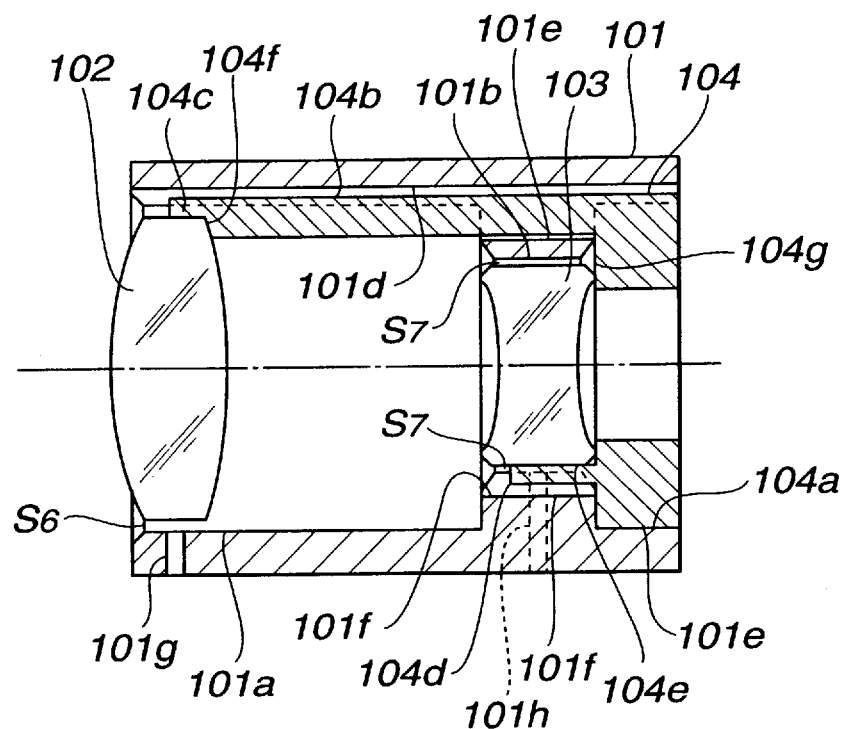
FIG. 20 is a longitudinal cross sectional view showing a state, in which the lens barrel as a lens barrel device according to the fourth embodiment of the invention is assembled by the assembly jig.
Figure 21:
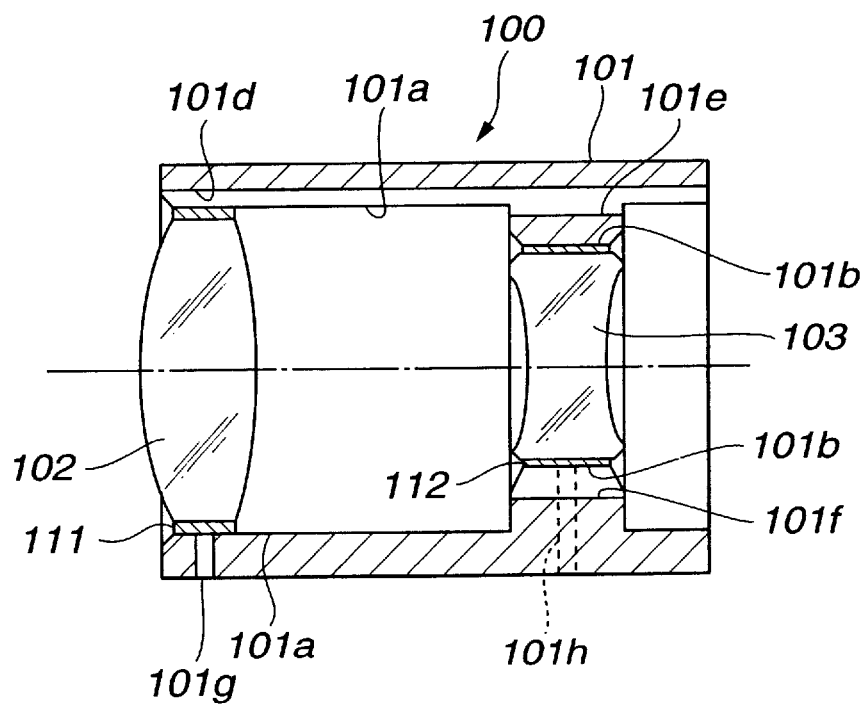
FIG. 21 is a longitudinal cross sectional view showing the lens barrel of the fourth embodiment after assembly.

FIG. 19 is an exploded, perspective view showing the above-mentioned lens body frame and assembly jigs therefor. FIG. 20 is a longitudinal cross sectional view showing a state, in which the above-mentioned lens body frame is assembled by the above-mentioned assembly jigs, and FIG. 21 is a longitudinal cross sectional view showing the above-mentioned lens body frame in a state, in which the above-mentioned assembly jigs are taken out. In addition, a photographic subject side of the lens barrel is a forward side, and an imaging side of the lens barrel is a rearward side in the following explanation.

The lens barrel 100 according to the embodiment is composed of a lens retaining frame 101, a first-group lens 102, and a second-group lens 103, which are a plurality of groups of lenses (optical elements), and is assembled with the use of an assembly jig 104 described later.

The lens retaining frame 101 is provided with a first-group lens retaining portion 101a, into which the first-group lens 102 can fit loosely in a forward portion thereof, a second-group lens retaining portion 101b, into which the second-group lens 103 can fit loosely in a rearward portion thereof, an inner periphery 101c, which accurately fits onto an outer diameter portion 104a of the assembly jig 104 described later, grooves 101d disposed on an inner periphery of the first-group lens retaining portion 101a, grooves 101f disposed on the second-group lens retaining portion 101b, and adhesive injection holes 101g, 101h extending through the first-group lens retaining portion 101a and the second-group lens retaining portion 101b from an outer periphery.

The grooves 101d have through holes 101e thereof extending through a frame portion of the second-group lens retaining portion 101b, and are provided along the first-group lens retaining portion 101a to permit arms 104b of the assembly jig 104 described later to extend therethrough from the rear. Also, the grooves 101f are provided on an inner periphery of the frame portion of the second-group lens retaining portion 101b, and permit projections 104d of the assembly jig 104, described later, to extend therethrough from the rear.

The assembly jig 104 comprises an outer diameter portion 104a adapted to fit accurately into the inner periphery 101c of the lens retaining frame, three arms 104b having at tip end thereof lens supports (inner peripheries) 104c, which fit accurately onto an outer periphery of the first-group lens 102, and projections 104d having lens supports (inner peripheries) 104e, which fit accurately onto an outer periphery of the second-group lens 103. In addition, the lens supports 104c, 104e are provided at rearward side end thereof in the direction of the optical axis with abutting surfaces 104f, 104g, against which the first-group lens 102 and the second-group lens 103, respectively, abut in the direction of the optical axis O.

When the lens barrel 100 according to the embodiment is to be assembled, the second-group lens 103 is mounted with the abutting surface 104g abutting against the lens supports 104e of the assembly jig 104. The assembly jig 104 is mounted by fitting the outer diameter portion 104a into the inner periphery 101c of the lens retaining frame 101 from rearward. Simultaneously, the arms 104b of the assembly jig are inserted into the grooves 101d, and the projections 104d is fitted into the grooves 101f.

After the assembly jig 104 is set, the first-group lens 102 is fitted into the lens supports 104c at a tip end of the assembly jig 104 to abut against the abutting surfaces 104f. In a state, in which the first-group lens 102 and the second-group lens 103 are mounted on the assembly jig, an adhesive (fixing agent) 111, 112 is injected into gaps S6, S7 between outer diameter portions of the lenses and the lens retaining portions from the adhesive injection holes 101g, 101h to perform adhesion and fixing of the lenses. After curing of the adhesive, the assembly jig 104 is taken out, and assembly of the lens barrel 100 is terminated (see FIG. 21).

With the lens body frame 100 according to the fourth embodiment and the method of assembling the lens body frame, the plurality of the first-group lens 102 and the second-group lens 103 are positioned by the assembly jig 104 in an abutting condition in the direction of the optical axis O and in a position of the optical axis O in an accurate fitting condition when the group of lenses are to be adhered. Meanwhile, when incorporating the jig before adhesion and fixing, the lens retaining frame 101 holds the plurality of the first-group lens 102 and the second-group lens 103 in a condition free from the axial position and the position of the optical axis, that is, in a floating condition. In a state, in which positioning is performed, the respective groups of lenses are adhered and fixed.

Accordingly, the respective groups of lenses can be accurately adhered and fixed to the lens retaining frame in accurate positions relative to an outer diameter of the lens retaining frame and to the guide shafts without depending upon accuracy such as dispersion in configuration of the lens retaining frame, thus enabling obtaining the lens body frame 100 having a good accuracy in positions of the groups of lenses. That is, deviation in spacings between the lenses and in centers of the lenses is suppressed to the minimum, thus enabling providing a lens body frame having a high accuracy.

In addition, an adhesive used in fixing of the respective parts in the respective embodiments of the invention described above is preferably an ultraviolet hardening-type adhesive. In this case, after the ultraviolet hardening-type adhesive is filled into necessary locations, ultraviolet rays are irradiated on the adhesive to cure the same. Of course, adhesives other than the ultraviolet hardening-type adhesive are applicable for use in the invention.

As described above, according to the invention, it is possible to provide a body frame and a method of assembling the same, which body frame can ensure optical performance without being affected by accuracies of frame members, guide members, photographing lenses and so on.

What is claimed is:

1. A lens barrel device comprising:
    a first group of lenses,
    a first retaining frame having a retaining portion for retaining the first group of lenses, the retaining portion retaining the first group of lenses with an adhesive therebetween, the first group of lenses being retained by the retaining frame in non-contact condition,
    a second group of lenses, and
    a second retaining frame having a retaining portion for retaining the second group of lenses, the retaining portion retaining the second group of lenses with an adhesive therebetween, the second group of lenses being retained by the retaining frame in non-contact condition, the second retaining frame being adapted to move relative to the first retaining frame.

2. The lens barrel device according to claim 1, wherein the first group of lenses and the second group of lenses, respectively, are retained by the first retaining frame and the second retaining frame so that an optical axis of the first group of lenses is coaxial with an optical axis of the second group of lenses.

3. The lens barrel device according to claim 1, further comprising a guide member fixed to one of the retaining frames for guiding the other of the retaining frames.

4. The lens barrel device according to claim 3, wherein the guide member is a straight rod member, and the retaining frame, to which the guide member is fixed, has a hole, which is adapted to loosely fit onto the rod member and to be fixed thereto by an adhesive.

5. A body frame comprising:
    an optical element,
    a guide member, and
    a frame member for supporting the guide member and fixing an outer peripheral surface of the optical element to the frame member through an adhesive in non-contact condition and for fixing the guide member and the optical element to each other in a predetermined relative, positional relationship.

6. The body frame according to claim 5, wherein the guide member is a shaft-shaped member or a tubular member.

7. The body frame according to claim 5, wherein the frame member fixed thereto only a portion of the outer peripheral surface of the optical element.

8. A method of assembling a body frame, the method comprising:
    mounting a plurality of optical elements directly on a jig;
    mounting a plurality of frame members on the jig such that each of the plurality of frame members retain a respective one of the plurality of optical elements in non-contact therewith;
    filling an adhesive between the each of the plurality of frame members and the respective optical elements; and
    disengaging the jig from the plurality of frame members and the respective optical elements after curing the adhesive.

9. The method according to claim 8, further comprising irradiating ultraviolet rays on the adhesive after filling of the adhesive, which is an ultraviolet hardening-type adhesive.

10. A method of assembling a body frame, the method comprising:
    mounting at least one optical element directly on a jig;
    mounting at least one frame member on the jig such that the at least one frame member retains the at least one optical element in non-contact therewith;
    filling an adhesive between the frame member and the optical element; and
    disengaging the jig from the frame member and the optical element after curing of the adhesive.

11. The method according to claim 10, further comprising irradiating ultraviolet rays on the adhesive after filling of the adhesive, which is an ultraviolet hardening-type adhesive.

12. A method of assembling a lens barrel device, the method comprising:
    mounting an optical element and a frame member which retains the optical element on a jig such that the optical element and frame member are in non-contact with each other and in a predetermined positional relationship; and
    adhering the optical element and the frame member to each other by an adhesive.

13. The method according to claim 12, wherein the jig has a semi-cylindrical shape divided by a plane extending through an optical axis of the optical element.

14. A method of assembling a lens barrel device, the method comprising:

mounting an optical element on a jig;

mounting a frame member on the jig, the frame member retaining the optical element;

mounting a guide member on the jig, the guide member guiding and supporting the frame member, wherein the optical element, the frame member and the guide member are in non-contact with one another and in a predetermined positional relationship;

adhering the optical element and the frame member to each other; and adhering the guide member and the frame member to each other.

15. The method according to claim 14, wherein the jig has a semi-cylindrical shape divided by a plane extending through an optical axis of the optical element.

16. A lens barrel device comprising:

a first optical element;

a first retaining frame for retaining the optical element;

an adhesive located between the first retaining frame and the first optical element such that the adhesive supports the first optical element in a non-contact relationship with the first retaining frame;

a second optical element;

a second retaining frame for retaining the second optical element, the second retaining frame being moveable relative to the first retaining frame.

17. The lens barrel device according to claim 16, wherein an adhesive supports the second optical element in a non-contact relationship with the second retaining frame.

18. The lens barrel device according to claim 16, further comprising a guide member fixed to the first retaining frame, the second retaining frame being moveable relative to the first retaining frame along the guide member.

19. The lens barrel device according to claim 16, wherein the first retaining frame has a semi-circular shape.

20. The lens barrel device according to claim 16, wherein the second retaining frame has a semi-circular shape.

21. An optical device comprising:

a lens;

a frame for retaining the lens; and an adhesive located between and contacting both the frame and the lens such that the adhesive supports the lens in a non-contact relationship with the frame.

22. An optical device according to claim 21, wherein the frame is rigid.

23. An optical device comprising:

an optical element;

a rigid frame for retaining the optical element; and an adhesive located between the rigid frame and the optical element such that the adhesive supports the optical element in a non-contact relationship with the rigid frame.

24. An optical device comprising:

a lens;

a moveable frame for retaining the lens; and an adhesive located between and contacting both the frame and the lens such that the adhesive supports the lens in a non-contact relationship with the frame.

25. The optical device according to claim 24, further comprising a housing surrounding the frame, the frame being moveable relative to the housing.

* * * * *